(12) United States Patent
Li et al.

(10) Patent No.: US 11,445,175 B2
(45) Date of Patent: *Sep. 13, 2022

(54) INTRA PREDICTION-BASED IMAGE CODING METHOD AND APPARATUS USING MPM LIST

(71) Applicant: LG ELECTRONICS INC., Seoul (KR)

(72) Inventors: Ling Li, Seoul (KR); Jin Heo, Seoul (KR); Seunghwan Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/952,259

(22) Filed: Nov. 19, 2020

(65) Prior Publication Data

US 2021/0092356 A1 Mar. 25, 2021

Related U.S. Application Data

(63) Continuation of application No. 16/805,231, filed on Feb. 28, 2020, now Pat. No. 10,931,943, which is a
(Continued)

(51) Int. Cl.
*H04N 19/105* (2014.01)
*H04N 19/132* (2014.01)
(Continued)

(52) U.S. Cl.
CPC ......... *H04N 19/105* (2014.11); *H04N 19/132* (2014.11); *H04N 19/159* (2014.11); *H04N 19/176* (2014.11)

(58) Field of Classification Search
CPC .. H04N 19/105; H04N 19/132; H04N 19/159; H04N 19/176
See application file for complete search history.

(56) References Cited

U.S. PATENT DOCUMENTS 10,931,943 B2 * 2/2021 Li .................. H04N 19/11
2016/0227211 A1 8/2016 Gisquet et al.
(Continued)

FOREIGN PATENT DOCUMENTS

BR 112020026381 A2 3/2021
KR 2018/0018570 A 2/2018
(Continued)

OTHER PUBLICATIONS

A. M. Kotra et al., "A simple 6-MPM list construction with truncated binary coding for non-MPM signalling", JVET-L0222-v2, Joint Video Experts Team (JVET) of ITU-T SG 16 WP 3 and ISO/IEC JTC 1/SC 29/WG 11, 12th Meeting: Macao, CN, Oct. 3-12, 2018.
(Continued)

*Primary Examiner* — James T Boylan
(74) *Attorney, Agent, or Firm* — Dentons US LLP

(57) ABSTRACT

A video decoding method according to this document includes deriving a first candidate intra prediction mode based on a first neighboring block located on a left side of a current block, deriving a second candidate intra prediction mode based on a second neighboring block located on an upper side of the current block, constructing a most probable mode (MPM) list for the current block based on the first candidate intra prediction mode and the second candidate intra prediction mode, deriving an intra prediction mode for the current block based on the MPM list, generating predicted samples by performing prediction for the current block based on the intra prediction mode, and generating a reconstructed picture for the current block based on the predicted samples.

6 Claims, 20 Drawing Sheets

Related U.S. Application Data continuation of application No. PCT/KR2019/013223, filed on Oct. 8, 2019.

(60) Provisional application No. 62/742,972, filed on Oct. 9, 2018.

(51) Int. Cl.
*H04N 19/159* (2014.01)
*H04N 19/176* (2014.01)

(56) References Cited

U.S. PATENT DOCUMENTS

| | | | |
|---|---|---|---|
| 2016/0373782 A1 | 12/2016 | Zhao et al. | |
| 2017/0064331 A1 | 3/2017 | Korman et al. | |
| 2017/0272745 A1* | 9/2017 | Liu | H04N 19/11 |
| 2020/0021851 A1 | 1/2020 | Zhao | |
| 2020/0045322 A1* | 2/2020 | Ye | H04N 19/159 |
| 2020/0099927 A1 | 3/2020 | Ramasubramonian | |
| 2021/0051334 A1* | 2/2021 | Ahn | H04N 19/82 |
| 2021/0176492 A1* | 6/2021 | Kim | H04N 19/593 |
| 2021/0289229 A1* | 9/2021 | Ahn | H04N 19/157 |
| 2021/0329230 A1* | 10/2021 | Chiang | H04N 19/167 |

FOREIGN PATENT DOCUMENTS

| | | | |
|---|---|---|---|
| KR | 1020180021816 | * | 2/2018 |
| KR | 1020180072558 | * | 6/2018 |
| KR | 1020180076783 | * | 7/2018 |
| KR | 1020180080822 | * | 7/2018 |

OTHER PUBLICATIONS

B. Bross et al., "Versatile Video Coding (Draft 2)", JVET-K1001-v6, Joint Video Experts Team (JVET) of ITU-T SG 16 WP 3 and ISO/IEC JTC 1/SC 29/WG 11, 11th Meeting: Ljubljana, SI, Jul. 10-18, 2018.

Kotra et al. "A simple 6-MPM list construction with truncated binary coding for non-MPM signalling" (Provided in IDS), Uploaded on Oct. 7, 2018.

Brass et al. "Versatile Video Coding Draft2" (Provided in IDS), Uploaded on Sep. 21, 2018.

U.S. Appl. No. 16/805,231, filed Feb. 28, 2020.

* cited by examiner

FIG. 19 ii. For i equal to 0 to 5, inclusive, when IntraPredModeY[ xCb ][ yCb ] is greater than or equal to candModeList[ i ], the value of IntraPredModeY[ xCb ][ yCb ] is incremented by one.

Figure 19:
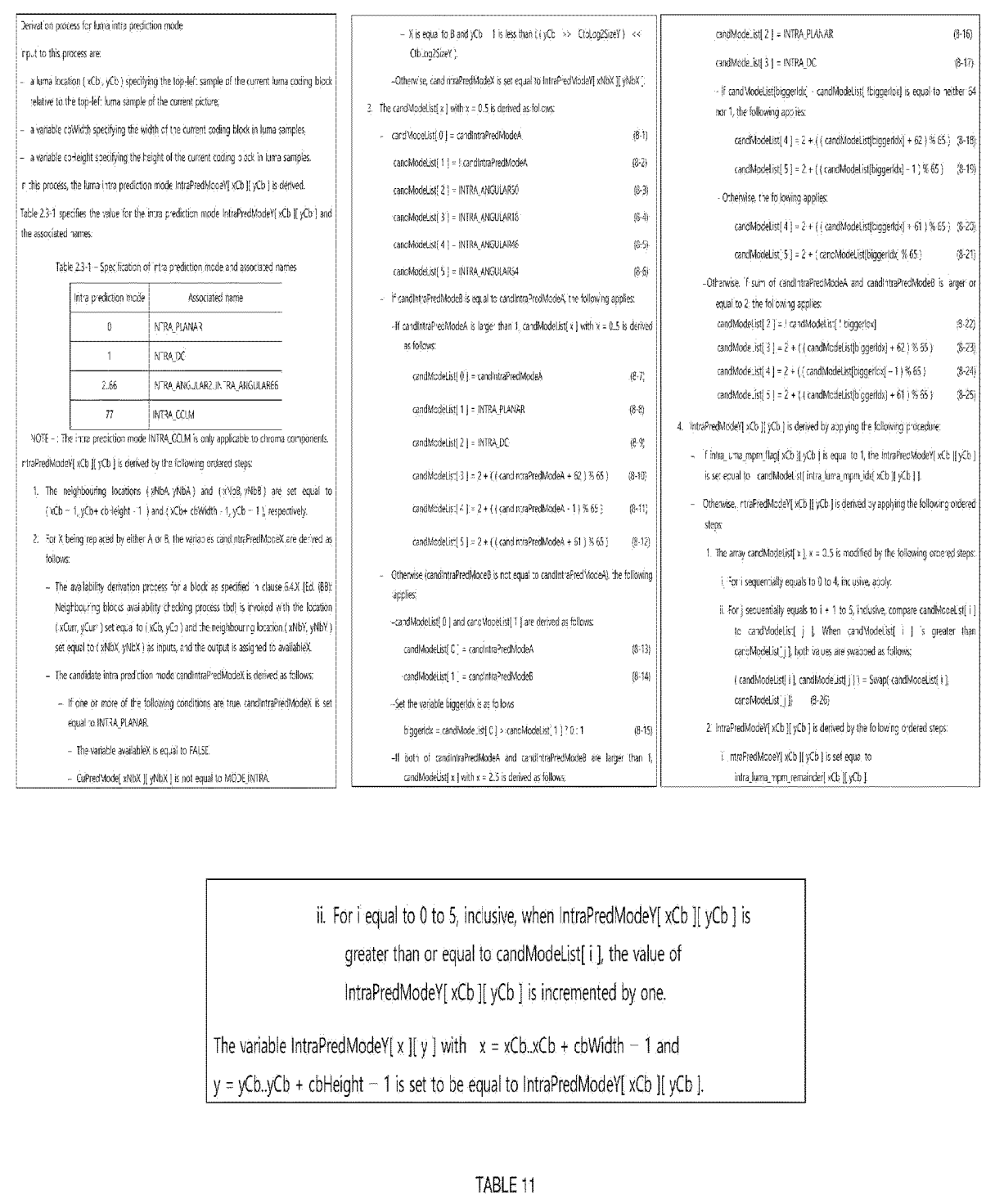

The variable IntraPredModeY[ x ][ y ] with x = xCb..xCb + cbWidth − 1 and y = yCb..yCb + cbHeight − 1 is set to be equal to IntraPredModeY[ xCb ][ yCb ].

TABLE 11

FIG. 20 iv. For i equal to 0 to 5, inclusive, when IntraPredModeY[ xCb ][ yCb ] is greater than or equal to candModeList[ i ], the value of IntraPredModeY[ xCb ][ yCb ] is incremented by one.

Figure 20:
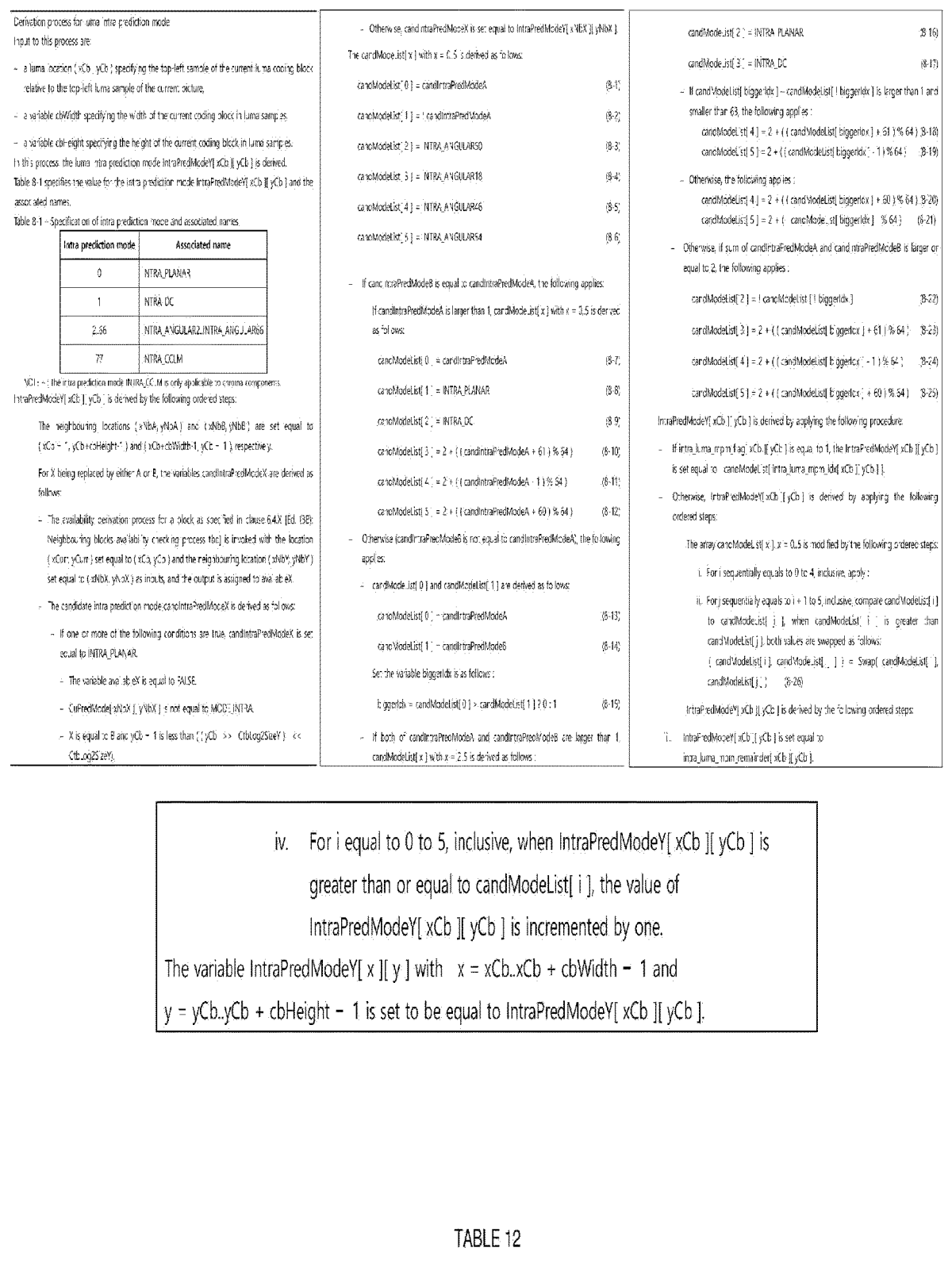

The variable IntraPredModeY[ x ][ y ] with x = xCb..xCb + cbWidth − 1 and y = yCb..yCb + cbHeight − 1 is set to be equal to IntraPredModeY[ xCb ][ yCb ].

TABLE 12

INTRA PREDICTION-BASED IMAGE CODING METHOD AND APPARATUS USING MPM LIST

CROSS-REFERENCE TO RELATED APPLICATIONS

Pursuant to 35 U.S.C. § 119(e), this application is a continuation of U.S. application Ser. No. 16/805,231, filed on Feb. 28, 2020, which is a continuation of International Application PCT/KR2019/013223, with an international filing date of Oct. 8, 2019, which claims the benefit of U.S. Provisional Application No. 62/742,972 filed on Oct. 9, 2018, the contents of which are all hereby incorporated by reference herein in their entirety.

BACKGROUND

Field

This document relates to an image coding technology and, more particularly, to a video coding method and apparatus using an intra prediction based on an MPM list.

Related Art

The demands for high-resolution and high-quality images and video, such as an ultra high definition (UHD) image and video of 4K or 8K or more, are recently increasing in various fields. As image and video data become high resolution and high quality, the amount of information or the number of bits that is relatively transmitted is increased compared to the existing image and video data. Accordingly, if image data is transmitted using a medium, such as the existing wired or wireless wideband line, or image and video data are stored using the existing storage medium, transmission costs and storage costs are increased.

Furthermore, interests and demands for immersive media, such as virtual reality (VR), artificial reality (AR) content or a hologram, are recently increasing. The broadcasting of an image and video having image characteristics different from those of real images, such as game images, is increasing.

Accordingly, there is a need for a high-efficiency image and video compression technology in order to effectively compress and transmit or store and playback information of high-resolution and high-quality images and video having such various characteristics.

SUMMARY

This document provides a method and apparatus for enhancing image coding efficiency.

This document provides an efficient intra prediction method and apparatus.

This document provides a video coding method and apparatus for deriving an MPM list for an efficient intra prediction.

This document provides an intra prediction method and apparatus for configuring MPM candidates within an MPM list for an efficient intra prediction.

In an aspect, there is provided a video decoding method performed by a decoding apparatus. The method includes deriving a first candidate intra prediction mode based on a first neighboring block which is located in a left side of a current block, deriving a second candidate intra prediction mode based on a second neighboring block which is located in an upper side of the current block, constructing MPM (Most Probable Mode) list for the current block based on the first candidate intra prediction mode and the second candidate intra prediction mode, deriving an intra prediction mode for the current block based on the MPM list, generating predicted samples by performing prediction for the current block based on the intra prediction mode, and generating a reconstructed picture for the current block based on the predicted samples. The step of constructing the MPM list includes deriving MPM candidates including at least one of the first candidate intra prediction mode or the second candidate intra prediction mode, and at least one candidate of the MPM candidates is derived by applying a 64 modular arithmetic operation to the first candidate intra prediction mode or the second candidate intra prediction mode.

In another aspect, there is provided a video encoding method performed by an encoding apparatus. The method includes deriving a first candidate intra prediction mode based on a first neighboring block which is located in a left side of a current block, deriving a second candidate intra prediction mode based on a second neighboring block which is located in an upper side of the current block, constructing MPM (Most Probable Mode) list for the current block based on the first candidate intra prediction mode and the second candidate intra prediction mode, determining an intra prediction mode for the current block, generate prediction samples by performing a prediction for the current block based on the intra prediction mode, and encoding image information including intra prediction mode information for the current block. The step of constructing the MPM list includes deriving MPM candidates including at least one of the first candidate intra prediction mode or the second candidate intra prediction mode, and at least one candidate of the MPM candidates is derived by applying a 64 modular arithmetic operation to the first candidate intra prediction mode or the second candidate intra prediction mode.

According to this document, overall image and video compression efficiency can be enhanced.

According to this document, computational complexity can be reduced and overall coding efficiency can be improved through an efficient intra prediction.

According to this document, an MPM list can be efficiently configured by considering an increase in the number of intra prediction modes. Furthermore, the accuracy of an MPM list for indicating an intra prediction mode of a current block can be improved, and overall coding efficiency can be improved.

According to this document, prediction performance can be improved and computational complexity can be reduced because MPM candidates within an MPM list are configured by considering prediction performance, complexity, prediction directivity, etc.

BRIEF DESCRIPTION OF THE DRAWINGS

FIG. 19 illustrates an MPM list which may be configured based on an algorithm (i.e., spec), such as Table 11 according to an embodiment of this document.

FIG. 20 illustrates an MPM list which may be configured based on an algorithm (i.e., spec), such as Table 12 according to another embodiment of this document.

DESCRIPTION OF EXEMPLARY EMBODIMENTS

Figure 1:
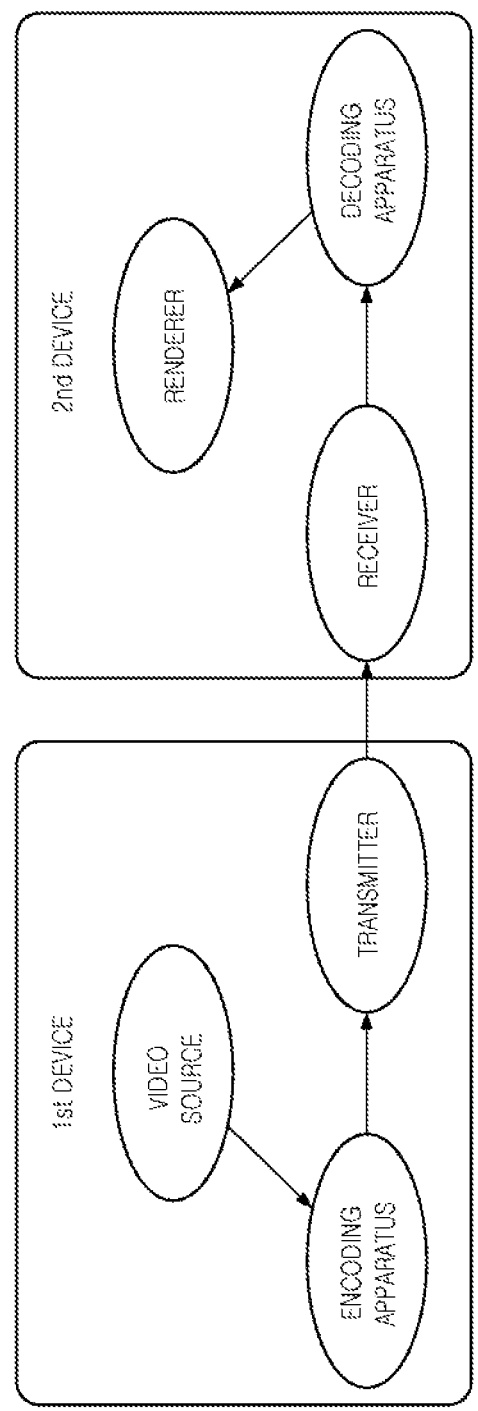
FIG. 1 schematically illustrates an example of a video/image coding system to which embodiments of this document may be applied.

This document may be modified in various ways and may have various embodiments, and specific embodiments will be illustrated in the drawings and described in detail. However, this does not intend to limit this document to the specific embodiments. Terms commonly used in this specification are used to describe a specific embodiment and is not used to limit the technical spirit of this document. An expression of the singular number includes plural expressions unless evidently expressed otherwise in the context. A term, such as "include" or "have" in this specification, should be understood to indicate the existence of a characteristic, number, step, operation, element, part, or a combination of them described in the specification and not to exclude the existence or the possibility of the addition of one or more other characteristics, numbers, steps, operations, elements, parts or a combination of them.

Meanwhile, elements in the drawings described in this document are independently illustrated for convenience of description related to different characteristic functions. This does not mean that each of the elements is implemented as separate hardware or separate software. For example, at least two of elements may be combined to form a single element, or a single element may be divided into a plurality of elements. An embodiment in which elements are combined and/or separated is also included in the scope of rights of this document unless it deviates from the essence of this document.

Hereinafter, preferred embodiments of this document are described more specifically with reference to the accompanying drawings. Hereinafter, in the drawings, the same reference numeral is used in the same element, and a redundant description of the same element may be omitted.

This document relates to video/image coding. For example, the methods/embodiments disclosed in this document may be applied to a method disclosed in the versatile video coding (VVC), the EVC (essential video coding) standard, the AOMedia Video 1 (AV1) standard, the 2nd generation of audio video coding standard (AVS2), or the next generation video/image coding standard (ex. H.267 or H.268, etc.).

This document presents various embodiments of video/image coding, and the embodiments may be performed in combination with each other unless otherwise mentioned.

In this document, video may refer to a series of images over time. Picture generally refers to a unit representing one image in a specific time zone, and a slice/tile is a unit constituting part of a picture in coding. The slice/tile may include one or more coding tree units (CTUs). One picture may consist of one or more slices/tiles. One picture may consist of one or more tile groups. One tile group may include one or more tiles. A brick may represent a rectangular region of CTU rows within a tile in a picture. A tile may be partitioned into multiple bricks, each of which consisting of one or more CTU rows within the tile. A tile that is not partitioned into multiple bricks may be also referred to as a brick. A brick scan is a specific sequential ordering of CTUs partitioning a picture in which the CTUs are ordered consecutively in CTU raster scan in a brick, bricks within a tile are ordered consecutively in a raster scan of the bricks of the tile, and tiles in a picture are ordered consecutively in a raster scan of the tiles of the picture. A tile is a rectangular region of CTUs within a particular tile column and a particular tile row in a picture. The tile column is a rectangular region of CTUs having a height equal to the height of the picture and a width specified by syntax elements in the picture parameter set. The tile row is a rectangular region of CTUs having a height specified by syntax elements in the picture parameter set and a width equal to the width of the picture. A tile scan is a specific sequential ordering of CTUs partitioning a picture in which the CTUs are ordered consecutively in CTU raster scan in a tile whereas tiles in a picture are ordered consecutively in a raster scan of the tiles of the picture. A slice includes an integer number of bricks of a picture that may be exclusively contained in a single NAL unit. A slice may consist of either the number of complete tiles or only a consecutive sequence of complete bricks of one tile. Tile groups and slices may be used interchangeably in this document. For example, in this document, a tile group/tile group header may be called a slice/slice header.

A pixel or a pel may mean a smallest unit constituting one picture (or image). Also, 'sample' may be used as a term corresponding to a pixel. A sample may generally represent a pixel or a value of a pixel, and may represent only a pixel/pixel value of a luma component or only a pixel/pixel value of a chroma component.

A unit may represent a basic unit of image processing. The unit may include at least one of a specific region of the picture and information related to the region. One unit may include one luma block and two chroma (ex. cb, cr) blocks. The unit may be used interchangeably with terms such as block or area in some cases. In a general case, an M×N block may include samples (or sample arrays) or a set (or array) of transform coefficients of M columns and N rows.

In this document, the term "/" and "," should be interpreted to indicate "and/or." For instance, the expression "A/B" may mean "A and/or B." Further, "A, B" may mean "A and/or B." Further, "A/B/C" may mean "at least one of A, B, and/or C." Also, "A/B/C" may mean "at least one of A, B, and/or C."

Further, in the document, the term "or" should be interpreted to indicate "and/or." For instance, the expression "A or B" may comprise 1) only A, 2) only B, and/or 3) both A and B. In other words, the term "or" in this document should be interpreted to indicate "additionally or alternatively."

FIG. 1 schematically illustrates an example of a video/image coding system to which embodiments of this document may be applied.

Referring to FIG. 1, a video/image coding system may include a first device (source device) and a second device (receiving device). The source device may deliver encoded video/image information or data in the form of a file or streaming to the receiving device via a digital storage medium or network.

The source device may include a video source, an encoding apparatus, and a transmitter. The receiving device may include a receiver, a decoding apparatus, and a renderer. The encoding apparatus may be called a video/image encoding apparatus, and the decoding apparatus may be called a video/image decoding apparatus. The transmitter may be included in the encoding apparatus. The receiver may be included in the decoding apparatus. The renderer may include a display, and the display may be configured as a separate device or an external component.

The video source may acquire video/image through a process of capturing, synthesizing, or generating the video/image. The video source may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding apparatus may encode input video/image. The encoding apparatus may perform a series of procedures such as prediction, transform, and quantization for compression and coding efficiency. The encoded data (encoded video/image information) may be output in the form of a bitstream.

The transmitter may transmit the encoded image/image information or data output in the form of a bitstream to the receiver of the receiving device through a digital storage medium or a network in the form of a file or streaming. The digital storage medium may include various storage mediums such as USB, SD, CD, DVD, Blueray, HDD, SSD, and the like. The transmitter may include an element for generating a media file through a predetermined file format and may include an element for transmission through a broadcast/communication network. The receiver may receive/extract the bitstream and transmit the received bitstream to the decoding apparatus.

The decoding apparatus may decode the video/image by performing a series of procedures such as dequantization, inverse transform, and prediction corresponding to the operation of the encoding apparatus.

The renderer may render the decoded video/image. The rendered video/image may be displayed through the display.

Figure 2:
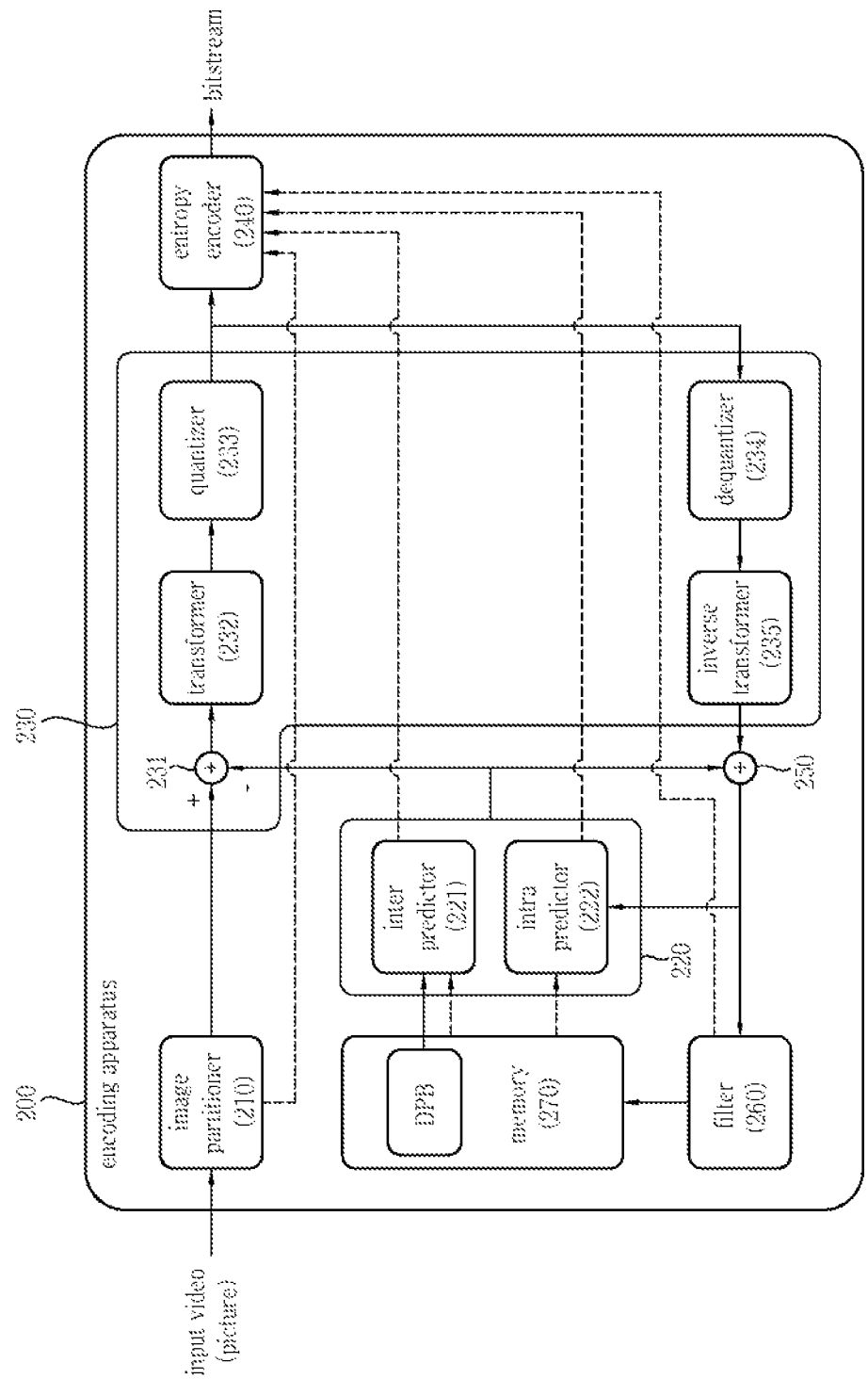
FIG. 2 is a diagram schematically describing the configuration of a video/image encoding apparatus to which embodiments of this document may be applied.

FIG. 2 is a schematic diagram illustrating a configuration of a video/image encoding apparatus to which the embodiments of the present document may be applied. Hereinafter, the video encoding apparatus may include an image encoding apparatus.

Referring to FIG. 2, the encoding apparatus 200 includes an image partitioner 210, a predictor 220, a residual processor 230, and an entropy encoder 240, an adder 250, a filter 260, and a memory 270. The predictor 220 may include an inter predictor 221 and an intra predictor 222. The residual processor 230 may include a transformer 232, a quantizer 233, a dequantizer 234, and an inverse transformer 235. The residual processor 230 may further include a subtractor 231. The adder 250 may be called a reconstructor or a reconstructed block generator. The image partitioner 210, the predictor 220, the residual processor 230, the entropy encoder 240, the adder 250, and the filter 260 may be configured by at least one hardware component (ex. an encoder chipset or processor) according to an embodiment. In addition, the memory 270 may include a decoded picture buffer (DPB) or may be configured by a digital storage medium. The hardware component may further include the memory 270 as an internal/external component.

The image partitioner 210 may partition an input image (or a picture or a frame) input to the encoding apparatus 200 into one or more processors. For example, the processor may be called a coding unit (CU). In this case, the coding unit may be recursively partitioned according to a quad-tree binary-tree ternary-tree (QTBTTT) structure from a coding tree unit (CTU) or a largest coding unit (LCU). For example, one coding unit may be partitioned into a plurality of coding units of a deeper depth based on a quad tree structure, a binary tree structure, and/or a ternary structure. In this case, for example, the quad tree structure may be applied first and the binary tree structure and/or ternary structure may be applied later. Alternatively, the binary tree structure may be applied first. The coding procedure according to this document may be performed based on the final coding unit that is no longer partitioned. In this case, the largest coding unit may be used as the final coding unit based on coding efficiency according to image characteristics, or if necessary, the coding unit may be recursively partitioned into coding units of deeper depth and a coding unit having an optimal size may be used as the final coding unit. Here, the coding procedure may include a procedure of prediction, transform, and reconstruction, which will be described later. As another example, the processor may further include a prediction unit (PU) or a transform unit (TU). In this case, the prediction unit and the transform unit may be split or partitioned from the aforementioned final coding unit. The prediction unit may be a unit of sample prediction, and the transform unit may be a unit for deriving a transform coefficient and/or a unit for deriving a residual signal from the transform coefficient.

The unit may be used interchangeably with terms such as block or area in some cases. In a general case, an M×N block may represent a set of samples or transform coefficients composed of M columns and N rows. A sample may generally represent a pixel or a value of a pixel, may represent only a pixel/pixel value of a luma component or represent only a pixel/pixel value of a chroma component. A sample may be used as a term corresponding to one picture (or image) for a pixel or a pel.

In the encoding apparatus 200, a prediction signal (predicted block, prediction sample array) output from the inter predictor 221 or the intra predictor 222 is subtracted from an input image signal (original block, original sample array) to generate a residual signal residual block, residual sample array), and the generated residual signal is transmitted to the transformer 232. In this case, as shown, a unit for subtracting a prediction signal (predicted block, prediction sample array) from the input image signal (original block, original sample array) in the encoder 200 may be called a subtractor 231. The predictor may perform prediction on a block to be processed (hereinafter, referred to as a current block) and generate a predicted block including prediction samples for the current block. The predictor may determine whether intra prediction or inter prediction is applied on a current block or CU basis. As described later in the description of each prediction mode, the predictor may generate various information related to prediction, such as prediction mode information, and transmit the generated information to the entropy encoder 240. The information on the prediction may be encoded in the entropy encoder 240 and output in the form of a bitstream.

The intra predictor 222 may predict the current block by referring to the samples in the current picture. The referred samples may be located in the neighborhood of the current block or may be located apart according to the prediction mode. In the intra prediction, prediction modes may include a plurality of non-directional modes and a plurality of directional modes. The non-directional mode may include, for example, a DC mode and a planar mode. The directional mode may include, for example, 33 directional prediction modes or 65 directional prediction modes according to the degree of detail of the prediction direction. However, this is merely an example, more or less directional prediction modes may be used depending on a setting. The intra predictor 222 may determine the prediction mode applied to the current block by using a prediction mode applied to a neighboring block.

The inter predictor 221 may derive a predicted block for the current block based on a reference block (reference sample array) specified by a motion vector on a reference picture. Here, in order to reduce the amount of motion information transmitted in the inter prediction mode, the motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. The reference picture including the reference block and the reference picture including the temporal neighboring block may be the same or different. The temporal neighboring block may be called a collocated reference block, a co-located CU (colCU), and the like, and the reference picture including the temporal neighboring block may be called a collocated picture (colPic). For example, the inter predictor 221 may configure a motion information candidate list based on neighboring blocks and generate information indicating which candidate is used to derive a motion vector and/or a reference picture index of the current block. Inter prediction may be performed based on various prediction modes. For example, in the case of a skip mode and a merge mode, the inter predictor 221 may use motion information of the neighboring block as motion information of the current block. In the skip mode, unlike the merge mode, the residual signal may not be transmitted. In the case of the motion vector prediction (MVP) mode, the motion vector of the neighboring block may be used as a motion vector predictor and the motion vector of the current block may be indicated by signaling a motion vector difference.

The predictor 220 may generate a prediction signal based on various prediction methods described below. For example, the predictor may not only apply intra prediction or inter prediction to predict one block but also simultaneously apply both intra prediction and inter prediction. This may be called combined inter and intra prediction (CIIP). In addition, the predictor may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in this document. The palette mode may be considered as an example of intra coding or intra prediction. When the palette mode is applied, a sample value within a picture may be signaled based on information on the palette table and the palette index.

The prediction signal generated by the predictor (including the inter predictor 221 and/or the intra predictor 222) may be used to generate a reconstructed signal or to generate a residual signal. The transformer 232 may generate transform coefficients by applying a transform technique to the residual signal. For example, the transform technique may include at least one of a discrete cosine transform (DCT), a discrete sine transform (DST), a karhunen-loève transform (KLT), a graph-based transform (GBT), or a conditionally non-linear transform (CNT). Here, the GBT means transform obtained from a graph when relationship information between pixels is represented by the graph. The CNT refers to transform generated based on a prediction signal generated using all previously reconstructed pixels. In addition, the transform process may be applied to square pixel blocks having the same size or may be applied to blocks having a variable size rather than square.

The quantizer 233 may quantize the transform coefficients and transmit them to the entropy encoder 240 and the entropy encoder 240 may encode the quantized signal (information on the quantized transform coefficients) and output a bitstream. The information on the quantized transform coefficients may be referred to as residual information. The quantizer 233 may rearrange block type quantized transform coefficients into a one-dimensional vector form based on a coefficient scanning order and generate information on the quantized transform coefficients based on the quantized transform coefficients in the one-dimensional vector form. Information on transform coefficients may be generated. The entropy encoder 240 may perform various encoding methods such as, for example, exponential Golomb, context-adaptive variable length coding (CAVLC), context-adaptive binary arithmetic coding (CABAC), and the like. The entropy encoder 240 may encode information necessary for video/image reconstruction other than quantized transform coefficients (ex. values of syntax elements, etc.) together or separately. Encoded information (ex. encoded video/image information) may be transmitted or stored in units of NALs (network abstraction layer) in the form of a bitstream. The video/image information may further include information on various parameter sets such as an adaptation parameter set (APS), a picture parameter set (PPS), a sequence parameter set (SPS), or a video parameter set (VPS). In addition, the video/image information may further include general constraint information. In this document, information and/or syntax elements transmitted/signaled from the encoding apparatus to the decoding apparatus may be included in video/picture information. The video/image information may be encoded through the above-described encoding procedure and included in the bitstream. The bitstream may be transmitted over a network or may be stored in a digital storage medium. The network may include a broadcasting network and/or a communication network, and the digital storage medium may include various storage media such as USB, SD, CD, DVD, Blueray, HDD, SSD, and the like. A transmitter (not shown) transmitting a signal output from the entropy encoder 240 and/or a storage unit (not shown) storing the signal may be included as internal/external element of the encoding apparatus 200, and alternatively, the transmitter may be included in the entropy encoder 240.

The quantized transform coefficients output from the quantizer 233 may be used to generate a prediction signal. For example, the residual signal (residual block or residual samples) may be reconstructed by applying dequantization and inverse transform to the quantized transform coefficients through the dequantizer 234 and the inverse transformer 235. The adder 250 adds the reconstructed residual signal to the prediction signal output from the inter predictor 221 or the intra predictor 222 to generate a reconstructed signal (reconstructed picture, reconstructed block, reconstructed sample array). If there is no residual for the block to be processed, such as a case where the skip mode is applied, the predicted block may be used as the reconstructed block. The adder 250 may be called a reconstructor or a reconstructed block generator. The generated reconstructed signal may be used for intra prediction of a next block to be processed in the current picture and may be used for inter prediction of a next picture through filtering as described below. Meanwhile, luma mapping with chroma scaling (LMCS) may be applied during picture encoding and/or reconstruction.

The filter 260 may improve subjective/objective image quality by applying filtering to the reconstructed signal. For example, the filter 260 may generate a modified reconstructed picture by applying various filtering methods to the reconstructed picture and store the modified reconstructed picture in the memory 270, specifically, a DPB of the memory 270. The various filtering methods may include, for example, deblocking filtering, a sample adaptive offset, an adaptive loop filter, a bilateral filter, and the like. The filter 260 may generate various information related to the filtering and transmit the generated information to the entropy encoder 240 as described later in the description of each filtering method. The information related to the filtering may be encoded by the entropy encoder 240 and output in the form of a bitstream.

The modified reconstructed picture transmitted to the memory 270 may be used as the reference picture in the inter predictor 221. When the inter prediction is applied through the encoding apparatus, prediction mismatch between the encoding apparatus 200 and the decoding apparatus may be avoided and encoding efficiency may be improved.

The DPB of the memory 270 DPB may store the modified reconstructed picture for use as a reference picture in the inter predictor 221. The memory 270 may store the motion information of the block from which the motion information in the current picture is derived (or encoded) and/or the motion information of the blocks in the picture that have already been reconstructed. The stored motion information may be transmitted to the inter predictor 221 and used as the motion information of the spatial neighboring block or the motion information of the temporal neighboring block. The memory 270 may store reconstructed samples of reconstructed blocks in the current picture and may transfer the reconstructed samples to the intra predictor 222.

Figure 3:
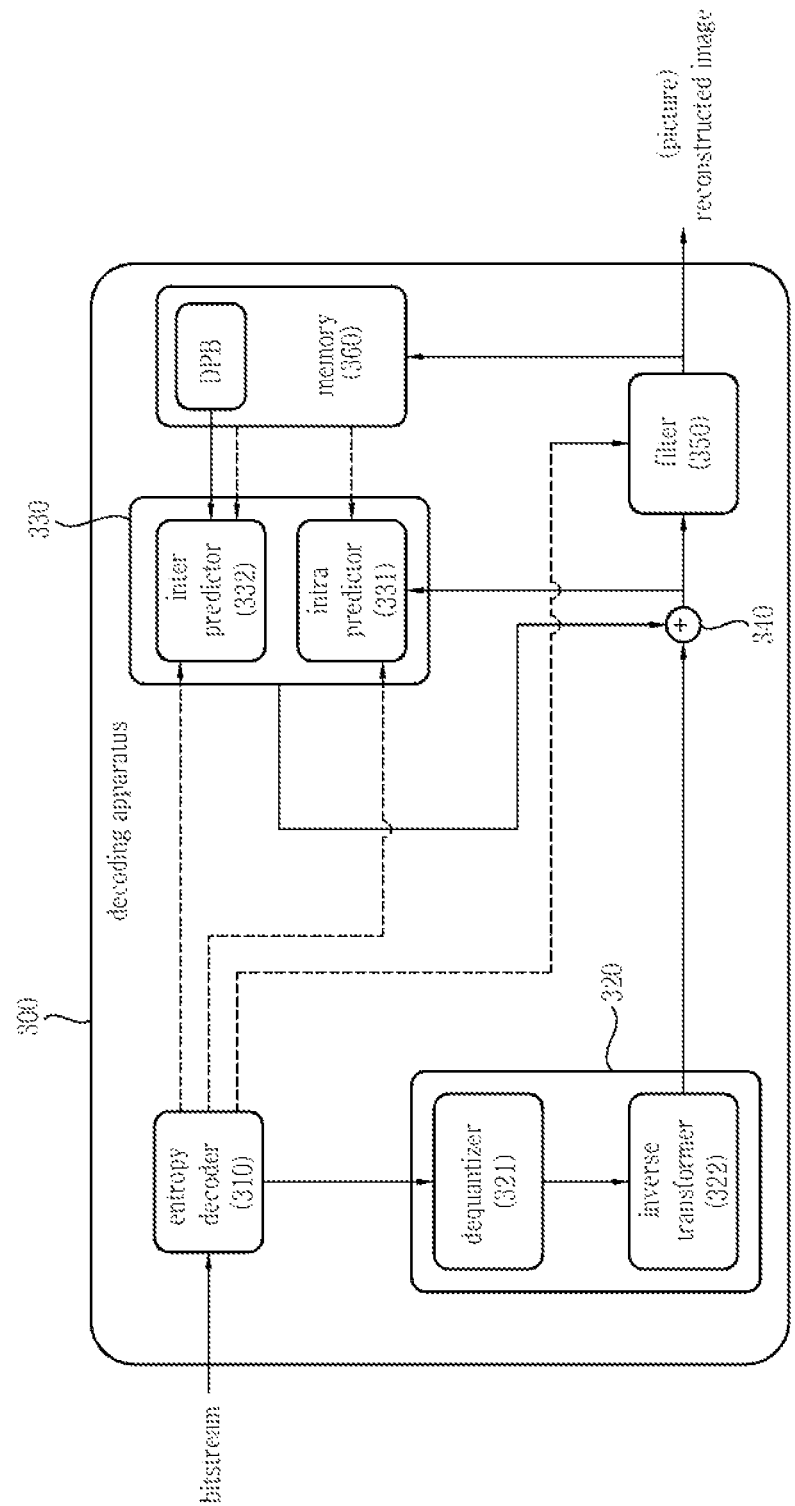
FIG. 3 is a diagram schematically describing the configuration of a video/image decoding apparatus to which embodiments of this document may be applied.

FIG. 3 is a schematic diagram illustrating a configuration of a video/image decoding apparatus to which the embodiment(s) of the present document may be applied.

Referring to FIG. 3, the decoding apparatus 300 may include an entropy decoder 310, a residual processor 320, a predictor 330, an adder 340, a filter 350, and a memory 360. The predictor 330 may include an inter predictor 331 and an intra predictor 332. The residual processor 320 may include a dequantizer 321 and an inverse transformer 321. The entropy decoder 310, the residual processor 320, the predictor 330, the adder 340, and the filter 350 may be configured by a hardware component (ex. a decoder chipset or a processor) according to an embodiment. In addition, the memory 360 may include a decoded picture buffer (DPB) or may be configured by a digital storage medium. The hardware component may further include the memory 360 as an internal/external component.

When a bitstream including video/image information is input, the decoding apparatus 300 may reconstruct an image corresponding to a process in which the video/image information is processed in the encoding apparatus of FIG. 2. For example, the decoding apparatus 300 may derive units/blocks based on block partition related information obtained from the bitstream. The decoding apparatus 300 may perform decoding using a processor applied in the encoding apparatus. Thus, the processor of decoding may be a coding unit, for example, and the coding unit may be partitioned according to a quad tree structure, binary tree structure and/or ternary tree structure from the coding tree unit or the largest coding unit. One or more transform units may be derived from the coding unit. The reconstructed image signal decoded and output through the decoding apparatus 300 may be reproduced through a reproducing apparatus.

The decoding apparatus 300 may receive a signal output from the encoding apparatus of FIG. 2 in the form of a bitstream, and the received signal may be decoded through the entropy decoder 310. For example, the entropy decoder 310 may parse the bitstream to derive information (ex. video/image information) necessary for image reconstruction (or picture reconstruction). The video/image information may further include information on various parameter sets such as an adaptation parameter set (APS), a picture parameter set (PPS), a sequence parameter set (SPS), or a video parameter set (VPS). In addition, the video/image information may further include general constraint information. The decoding apparatus may further decode picture based on the information on the parameter set and/or the general constraint information. Signaled/received information and/or syntax elements described later in this document may be decoded may decode the decoding procedure and obtained from the bitstream. For example, the entropy decoder 310 decodes the information in the bitstream based on a coding method such as exponential Golomb coding, CAVLC, or CABAC, and output syntax elements required for image reconstruction and quantized values of transform coefficients for residual. More specifically, the CABAC entropy decoding method may receive a bin corresponding to each syntax element in the bitstream, determine a context model using a decoding target syntax element information, decoding information of a decoding target block or information of a symbol/bin decoded in a previous stage, and perform an arithmetic decoding on the bin by predicting a probability of occurrence of a bin according to the determined context model, and generate a symbol corresponding to the value of each syntax element. In this case, the CABAC entropy decoding method may update the context model by using the information of the decoded symbol/bin for a context model of a next symbol/bin after determining the context model. The information related to the prediction among the information decoded by the entropy decoder 310 may be provided to the predictor (the inter predictor 332 and the intra predictor 331), and the residual value on which the entropy decoding was performed in the entropy decoder 310, that is, the quantized transform coefficients and related parameter information, may be input to the residual processor 320. The residual processor 320 may derive the residual signal (the residual block, the residual samples, the residual sample array). In addition, information on filtering among information decoded by the entropy decoder 310 may be provided to the filter 350. Meanwhile, a receiver (not shown) for receiving a signal output from the encoding apparatus may be further configured as an internal/external element of the decoding apparatus 300, or the receiver may be a component of the entropy decoder 310. Meanwhile, the decoding apparatus according to this document may be referred to as a video/image/picture decoding apparatus, and the decoding apparatus may be classified into an information decoder (video/image/picture information decoder) and a sample decoder (video/image/picture sample decoder). The information decoder may include the entropy decoder 310, and the sample decoder may include at least one of the dequantizer 321, the inverse transformer 322, the adder 340, the filter 350, the memory 360, the inter predictor 332, and the intra predictor 331.

The dequantizer 321 may dequantize the quantized transform coefficients and output the transform coefficients. The dequantizer 321 may rearrange the quantized transform coefficients in the form of a two-dimensional block form. In this case, the rearrangement may be performed based on the coefficient scanning order performed in the encoding apparatus. The dequantizer 321 may perform dequantization on the quantized transform coefficients by using a quantization parameter (ex. quantization step size information) and obtain transform coefficients.

The inverse transformer 322 inversely transforms the transform coefficients to obtain a residual signal (residual block, residual sample array).

The predictor may perform prediction on the current block and generate a predicted block including prediction samples for the current block. The predictor may determine whether intra prediction or inter prediction is applied to the current block based on the information on the prediction output from the entropy decoder 310 and may determine a specific intra/inter prediction mode.

The predictor 320 may generate a prediction signal based on various prediction methods described below. For example, the predictor may not only apply intra prediction or inter prediction to predict one block but also simultaneously apply intra prediction and inter prediction. This may be called combined inter and intra prediction (CIIP). In addition, the predictor may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in this document. The palette mode may be considered as an example of intra coding or intra prediction. When the palette mode is applied, a sample value within a picture may be signaled based on information on the palette table and the palette index.

The intra predictor 331 may predict the current block by referring to the samples in the current picture. The referred samples may be located in the neighborhood of the current block or may be located apart according to the prediction mode. In the intra prediction, prediction modes may include a plurality of non-directional modes and a plurality of directional modes. The intra predictor 331 may determine the prediction mode applied to the current block by using a prediction mode applied to a neighboring block.

The intra predictor 331 may predict the current block by referring to the samples in the current picture. The referenced samples may be located in the neighborhood of the current block or may be located apart according to the prediction mode. In intra prediction, prediction modes may include a plurality of non-directional modes and a plurality of directional modes. The intra predictor 331 may determine the prediction mode applied to the current block by using the prediction mode applied to the neighboring block.

The inter predictor 332 may derive a predicted block for the current block based on a reference block (reference sample array) specified by a motion vector on a reference picture. In this case, in order to reduce the amount of motion information transmitted in the inter prediction mode, motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. For example, the inter predictor 332 may configure a motion information candidate list based on neighboring blocks and derive a motion vector of the current block and/or a reference picture index based on the received candidate selection information. Inter prediction may be performed based on various prediction modes, and the information on the prediction may include information indicating a mode of inter prediction for the current block.

The adder 340 may generate a reconstructed signal (reconstructed picture, reconstructed block, reconstructed sample array) by adding the obtained residual signal to the prediction signal (predicted block, predicted sample array) output from the predictor (including the inter predictor 332 and/or the intra predictor 331). If there is no residual for the block to be processed, such as when the skip mode is applied, the predicted block may be used as the reconstructed block.

The adder 340 may be called reconstructor or a reconstructed block generator. The generated reconstructed signal may be used for intra prediction of a next block to be processed in the current picture, may be output through filtering as described below, or may be used for inter prediction of a next picture.

Meanwhile, luma mapping with chroma scaling (LMCS) may be applied in the picture decoding process.

The filter 350 may improve subjective/objective image quality by applying filtering to the reconstructed signal. For example, the filter 350 may generate a modified reconstructed picture by applying various filtering methods to the reconstructed picture and store the modified reconstructed picture in the memory 360, specifically, a DPB of the memory 360. The various filtering methods may include, for example, deblocking filtering, a sample adaptive offset, an adaptive loop filter, a bilateral filter, and the like.

The (modified) reconstructed picture stored in the DPB of the memory 360 may be used as a reference picture in the inter predictor 332. The memory 360 may store the motion information of the block from which the motion information in the current picture is derived (or decoded) and/or the motion information of the blocks in the picture that have already been reconstructed. The stored motion information may be transmitted to the inter predictor 260 so as to be utilized as the motion information of the spatial neighboring block or the motion information of the temporal neighboring block. The memory 360 may store reconstructed samples of reconstructed blocks in the current picture and transfer the reconstructed samples to the intra predictor 331.

In the present disclosure, the embodiments described in the filter 260, the inter predictor 221, and the intra predictor 222 of the encoding apparatus 200 may be the same as or respectively applied to correspond to the filter 350, the inter predictor 332, and the intra predictor 331 of the decoding apparatus 300. The same may also apply to the unit 332 and the intra predictor 331.

As described above, in performing video coding, a prediction is performed to enhance compression efficiency. A predicted block including prediction samples for a current block, that is, a target coding block, can be generated through the prediction. In this case, the predicted block includes the prediction samples in a spatial domain (or pixel domain). The predicted block is identically derived in the encoding apparatus and the decoding apparatus. The encoding apparatus can enhance image coding efficiency by signaling, to the decoding apparatus, information on a residual (residual information) between the original block not an original sample value itself of the original block and the predicted block. The decoding apparatus may derive a residual block including residual samples based on the residual information, may generate a reconstructed including reconstructed samples by adding the residual block and the predicted block, and may generate a reconstructed picture including the reconstructed blocks.

The residual information may be generated through a transform and quantization procedure. For example, the encoding apparatus may derive the residual block between the original block and the predicted block, may derive transform coefficients by performing a transform procedure on the residual samples (residual sample array) included in the residual block, may derive quantized transform coefficients by performing a quantization procedure on the transform coefficients, and may signal related residual information to the decoding apparatus (through a bitstream). In this case, the residual information may include information, such as value information, location information, transform scheme, transform kernel, and quantization parameter of the quantized transform coefficients. The decoding apparatus may perform a dequantization/inverse transform procedure based on the residual information, and may derive residual samples (or residual block). The decoding apparatus may generate a reconstructed picture based on the predicted block and the residual block. Furthermore, the encoding apparatus may derive a residual block by dequantizing/inverse-transforming the quantized transform coefficients for reference to the inter prediction of a subsequent picture, and may generate a reconstructed picture.

Figure 4:
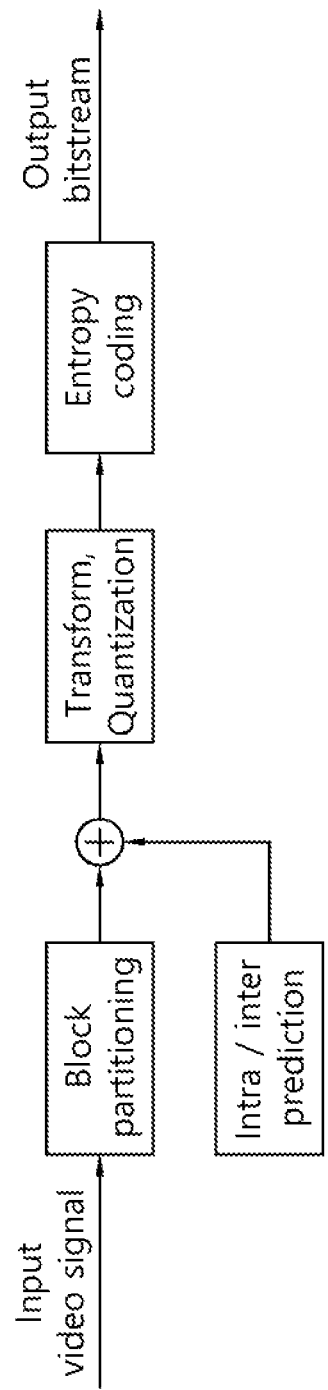
FIG. 4 illustrates an example of an image encoding method performed by a video encoding apparatus.

FIG. 4 illustrates an example of an image encoding method performed by a video encoding apparatus.

Referring to FIG. 4, the image encoding method may include block partitioning, intra/inter prediction, transform, quantization and entropy encoding processes. For example, a current picture may be partitioned into a plurality of blocks. A prediction block of a current block may be generated through an intra/inter prediction. A residual block of the current block may be generated through a subtraction between an input block of the current block and the prediction block. Thereafter, a coefficient block, that is, transform coefficients of the current block, may be generated through a transform for the residual block. The transform coefficients may be quantized and entropy-encoded and stored in a bitstream.

Figure 5:
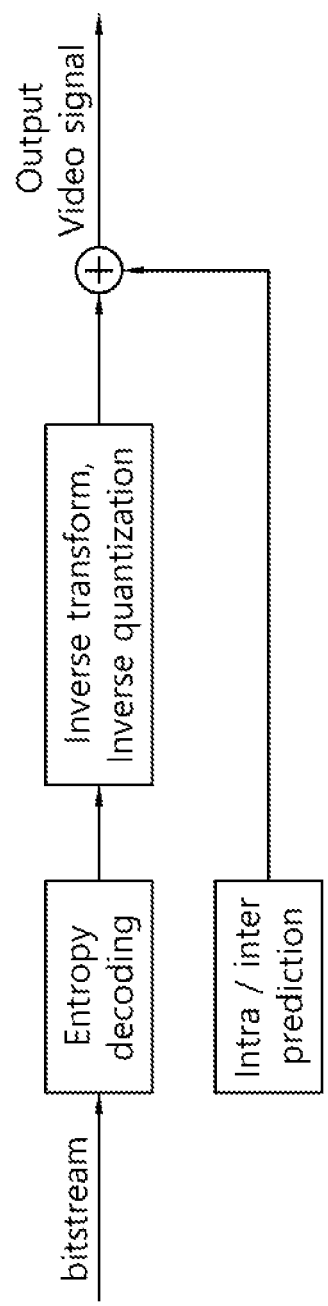
FIG. 5 illustrates an example of a video coding method performed by a decoding apparatus.

FIG. 5 illustrates an example of a video coding method performed by a decoding apparatus.

Referring to FIG. 5, the image coding method may include entropy decoding, inverse quantization, inverse transform and intra/inter prediction processes. For example, the decoding apparatus may perform processes opposite those of the aforementioned encoding method. Specifically, quantized transform coefficients may be obtained through entropy decoding for a bitstream. A coefficient block of a current block, that is, transform coefficients, may be obtained through an inverse quantization process for the quantized transform coefficients. A residual block of the current block may be derived through an inverse transform for the transform coefficients. A reconstructed block of the current block may be derived through the addition of a prediction block of the current block, derived through an intra/inter prediction, and the residual block.

Meanwhile, if an intra prediction is performed, a correlation between samples may be used, and a difference between the original block and a prediction block, that is, a residual, may be obtained. The aforementioned transform and quantization may be applied to the residual. Accordingly, spatial redundancy can be reduced. Hereinafter, an encoding method and a decoding method using an intra prediction are specifically described.

An intra prediction refers to a prediction for generating prediction samples for a current block based on reference samples outside the current block within a picture (hereinafter a current picture) including the current block. In this case, the reference samples outside the current block may refer to samples located in the periphery of the current block. If an intra prediction is applied to the current block, neighboring reference samples to be used for the intra prediction of the current block may be derived.

For example, when the size (width x height) of a current block is nW×nH, neighboring reference samples of the current block may include a sample neighboring the left boundary and a total of 2×nH samples neighboring the bottom left of the current block, a sample neighboring the top boundary and a total of 2×nW samples neighboring the top right of the current block, and one sample neighboring the left top of the current block. Alternatively, neighboring reference samples of a current block may also include a plurality of columns of top neighboring samples and a plurality of rows of left neighboring samples. Furthermore, neighboring reference samples of a current block may also include a total of nH samples neighboring the right boundary of the current block having an nW×nH size, a total of nW samples neighboring the bottom boundary of the current block and one sample neighboring the bottom right of the current block.

In this case, some of the neighboring reference samples of the current block have not been decoded or may not be available. In this case, the decoding apparatus may configure neighboring reference samples to be used for a prediction by substituting unavailable samples with available samples. Alternatively, neighboring reference samples to be used for a prediction may be configured through the interpolation of available samples.

If neighboring reference samples are derived, (i) a prediction sample may be derived based on an average or interpolation of the neighboring reference samples of a current block, and (ii) a prediction sample may be derived based on a reference sample present in a specific (prediction) direction for the prediction sample among neighboring reference samples of a current block. (i) may be applied when an intra prediction mode is a non-directional mode or a non-angular mode. (ii) may be applied when an intra prediction mode is a directional mode or an angular mode.

Furthermore, a prediction sample may be generated through interpolation between a first neighboring sample, located in the prediction direction of an intra prediction mode of a current block, and a second neighboring sample corresponding to the first neighboring sample based on a prediction sample of the current block among neighboring reference samples. The second neighboring sample may be a sample located in a direction opposite the prediction direction of the intra prediction mode of the current block. The above case may be called a linear interpolation intra prediction (LIP). Furthermore, a temporary prediction sample of a current block may be derived based on filtered neighboring reference samples. A prediction sample of the current block may be derived by weighted-summing at least one reference sample, derived based on an intra prediction mode, and the temporary prediction sample among the existing neighboring reference samples, that is, not-filtered neighboring reference samples. The above case may be called a position dependent intra prediction (PDCP). Meanwhile, post-filtering for the derived prediction sample may be performed, if necessary.

Specifically, an intra prediction procedure may include an intra prediction mode determination step, a neighboring reference sample derivation step, and an intra prediction mode-based prediction sample derivation step. Furthermore, a post-filtering step for a derived prediction sample may be performed, if necessary.

Figure 6:
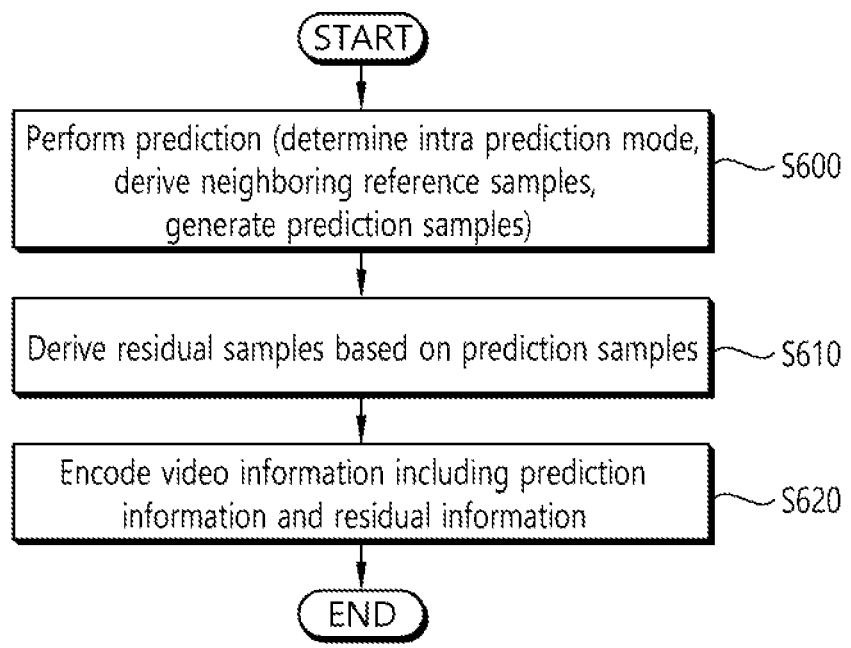
FIG. 6 illustrates an example of an image encoding method based on an intra prediction and FIG. 7 schematically illustrates an intra predictor within the encoding apparatus.
Figure 7:
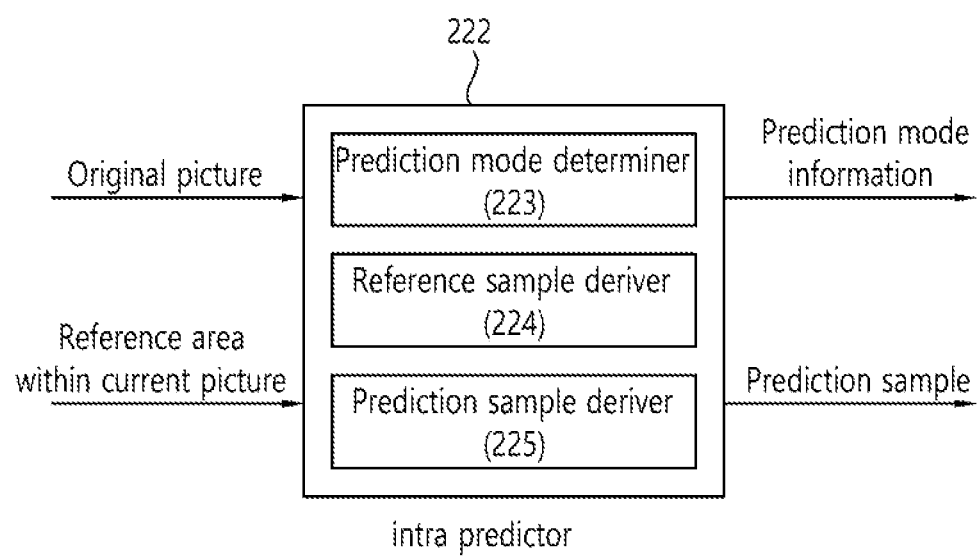

FIG. 6 illustrates an example of an image encoding method based on an intra prediction and FIG. 7 schematically illustrates an intra predictor within the encoding apparatus. The intra predictor within the encoding apparatus in FIG. 7 may be applied to the intra predictor 222 of the encoding apparatus 200 in FIG. 2 identically or in a corresponding way.

Referring to FIGS. 6 and 7, S600 may be performed by the intra predictor 222 of the encoding apparatus. S610 may be performed by the residual processor 230 of the encoding apparatus. Specifically, S610 may be performed by the subtractor 231 of the encoding apparatus. At S620, prediction information may be derived by the intra predictor 222 and may be encoded by the entropy encoder 240. At S620, residual information may be derived by the residual processor 230 and may be encoded by the entropy encoder 240. The residual information is information related to residual samples. The residual information may include information related to quantized transform coefficients for the residual samples. As described above, the residual samples may be derived as transform coefficients through the transformer 232 of the encoding apparatus. The transform coefficients may be derived as quantized transform coefficients through the quantizer 233. Information related to the quantized transform coefficients may be encoded by the entropy encoder 240 through a residual coding procedure.

The encoding apparatus may perform an intra prediction for a current block (S600). The encoding apparatus may derive an intra prediction mode of the current block, may derive neighboring reference samples of the current block, and may generate prediction samples within the current block based on the intra prediction mode and the neighboring reference samples. In this case, the intra prediction mode determination, neighboring reference sample derivation and prediction sample generation procedures may be performed may be performed or any one procedure may be performed prior to another procedure.

In one embodiment, the intra predictor 222 of the encoding apparatus may include a prediction mode determiner 223, a reference sample deriver 224, and a prediction sample deriver 225. The prediction mode determiner 223 may determine an intra prediction mode for a current block. The reference sample deriver 224 may derive neighboring reference samples of the current block. The prediction sample deriver 225 may derive prediction samples of the current block. Meanwhile, although not illustrated, if a prediction sample filtering procedure to be described later is performed, the intra predictor 222 may further include a prediction sample filter unit (not illustrated). The encoding apparatus may determine a mode applied to a current block among a plurality of intra prediction modes. The encoding apparatus may compare RD costs for the intra prediction modes, and may determine the best intra prediction mode of the current block.

As described above, the encoding apparatus may perform a prediction sample filtering procedure. The prediction sample filtering may be called post filtering. Some or all of prediction samples may be filtered by the prediction sample filtering procedure. The prediction sample filtering procedure may be omitted according to circumstances.

The encoding apparatus may generate residual samples for the current block based on (filtered) prediction samples (S610). The encoding apparatus may encode image information, including prediction mode information indicative of the intra prediction mode and residual information related to the residual samples (S620). The encoded image information may be output in a bitstream form. The output bitstream may be transmitted to the decoding apparatus through a storage medium over a network.

As described above, the encoding apparatus may generate a reconstructed picture (including reconstructed samples and a reconstructed block) based on prediction samples and residual samples. This is for deriving, by the encoding apparatus, the same prediction results as those performed in the decoding apparatus. The reason for this is that coding efficiency can be enhanced. Furthermore, as described above, an in-loop filtering procedure may be further applied to the reconstructed picture.

Figure 8:
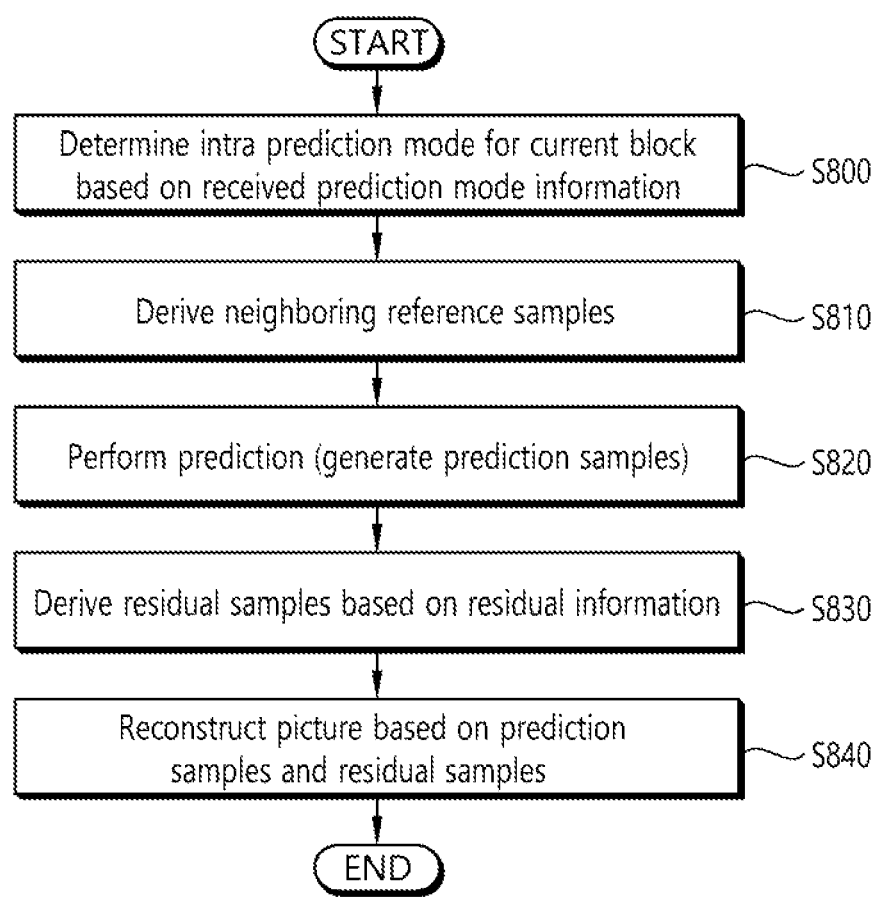
FIG. 8 illustrates an example of a video coding method based on an intra prediction and FIG. 9 schematically illustrates an intra predictor within the decoding apparatus.
Figure 9:
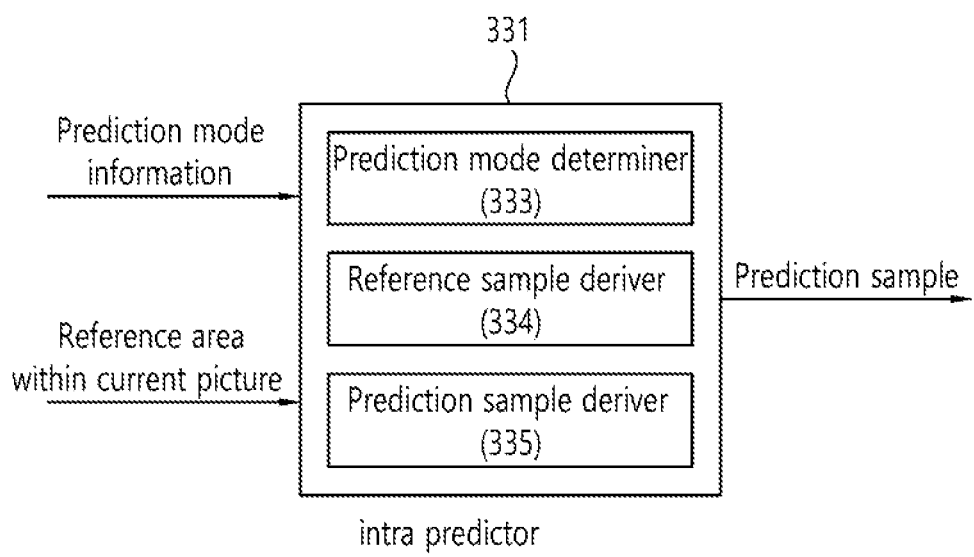

FIG. 8 illustrates an example of a video coding method based on an intra prediction and FIG. 9 schematically illustrates an intra predictor within the decoding apparatus. An intra predictor within the decoding apparatus in FIG. 9 may be applied to the intra predictor 331 of the decoding apparatus 300 in FIG. 3 identically or in a corresponding way.

Referring to FIGS. 8 and 9, the decoding apparatus may perform operations corresponding to the operations performed in the encoding apparatus. The decoding apparatus may perform a prediction on a current block and derive prediction samples based on received prediction information.

S800 to S820 may be performed by the intra predictor 331 of the decoding apparatus. In S830, residual information may be obtained from a bitstream by the entropy decoder 310 of the decoding apparatus. The residual processor 320 of the decoding apparatus may derive residual samples for a current block based on the residual information. Specifically, the dequantizer 321 of the residual processor may derive transform coefficients by performing inverse quantization based on quantized transform coefficients derived based on residual information. The inverse transformer 322 of the residual processor 320 may derive residual samples for the current block by performing an inverse transform for the transform coefficients. S840 may be performed by the adder 340 or reconstructor of the decoding apparatus.

The decoding apparatus may derive an intra prediction mode for a current block based on received prediction mode information (S800). The decoding apparatus may derive neighboring reference samples of the current block (S810). The decoding apparatus may generate prediction samples within a current block based on the intra prediction mode and the neighboring reference samples (S820). In this case, the decoding apparatus may perform a prediction sample filtering procedure. The prediction sample filtering may be called post filtering. Some or all of the prediction samples may be filtered by the prediction sample filtering procedure. The prediction sample filtering procedure may be omitted according to circumstances.

The decoding apparatus may generate residual samples for the current block based on the received residual information (S830). The decoding apparatus may generate reconstructed samples for the current block based on (filtered) prediction samples and the residual samples, and may generate a reconstructed picture based on the reconstructed samples (S840).

In one embodiment, the intra predictor 331 of the decoding apparatus may include a prediction mode determiner 333, a reference sample deriver 334, and a prediction sample deriver 335. The prediction mode determiner 333 may determine an intra prediction mode for a current block based on prediction mode information received from the prediction mode determiner 223 of the encoding apparatus. The reference sample deriver 334 may derive neighboring reference samples of the current block. The prediction sample deriver 335 may derive prediction samples of the current block. Meanwhile, although not illustrated, if the prediction sample filtering procedure is performed, the intra predictor 331 may further include a prediction sample filter unit (not illustrated).

Meanwhile, in performing an intra prediction, prediction mode information may be determined depending on whether a most probable mode (MPM) is applied to a current block. For example, the prediction mode information may include flag information (e.g., prev_intra_luma_pred_flag) indicating whether a most probable mode (MPM) is applied or a remaining mode is applied to a current block. If the MPM is applied to the current block, the prediction mode information may further include index information (e.g., mpm_idx) indicative of one of intra prediction mode candidates (MPM candidates). In this case, the intra prediction mode candidates (MPM candidates) may be configured as an MPM candidate list or an MPM list. Furthermore, if the MPM is not applied to the current block, the prediction mode information may further include remaining mode information (e.g., rem_inra_luma_pred_mode) indicative of one of the remaining intra prediction modes except intra prediction mode candidates (MPM candidates). The decoding apparatus may determine an intra prediction mode of the current block based on the prediction mode information. In this case, the prediction mode information may be encoded/decoded through a coding method to be described later. For example, the prediction mode information may be encoded/decoded through entropy coding (e.g., CABAC, CAVLC) based on a truncated (rice) binary code.

Furthermore, if an intra prediction is applied, in determining prediction mode information, an intra prediction mode applied to a current block may be determined using an intra prediction mode of a neighboring block. For example, the decoding apparatus may derive most probable mode (MPM) candidates based on an intra prediction mode of a left block and intra prediction mode of a top block of a current block, and may select one of the MPM candidates based on an MPM index (e.g., mpm_idx). Alternatively, the decoding apparatus may select one of the remaining intra prediction modes, not included in the MPM candidates, based on remaining intra prediction mode information (e.g., rem_inra_luma_pred_mode). The MPM index may be signaled in the form of an mpm_idx syntax element. The remaining intra prediction mode information may be signaled in the form of a rem_intra_luma_pred_mode syntax element. For example, the remaining intra prediction mode information may indicate one of the remaining intra prediction modes which are not included in the MPM candidates among all of intra prediction modes and which are indexed in order of a prediction mode number.

An intra prediction mode may include non-directional (or non-angular) intra prediction modes and directional (or angular) intra prediction modes. For example, in the HEVC standard, intra prediction modes including 2 non-directional prediction modes and 33 directional prediction modes are used. The non-directional prediction modes may include a planar intra prediction mode, that is, No. 0, and a DC intra prediction mode, that is, No. 1. The directional prediction modes may include No. 2 to No. 34 intra prediction modes. The planar mode intra prediction mode may be called a planar mode, and the DC intra prediction mode may be called a DC mode.

Figure 10:
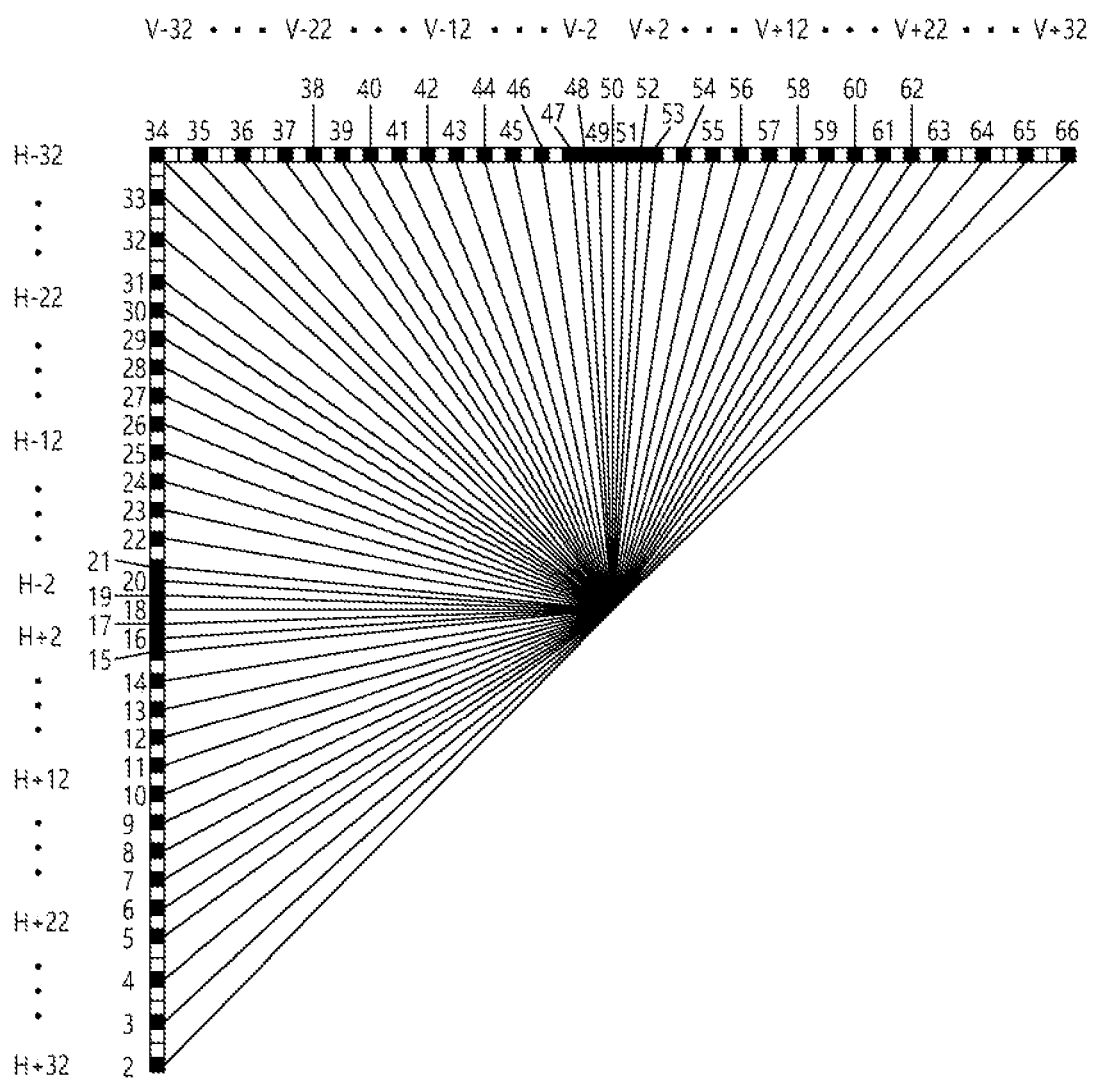
FIG. 10 illustrates 65 directional intra prediction modes.

Alternatively, in order to capture a given edge direction proposed in natural video, the directional intra prediction modes may be extended from the existing 33 modes to 65 modes as in FIG. 10. In this case, the intra prediction modes may include 2 non-directional intra prediction modes and 65 directional intra prediction modes. The non-directional intra prediction modes may include a planar intra prediction mode, that is, No. 0, and a DC intra prediction mode, that is, No. 1. The directional intra prediction modes may include Nos. 2 to 66 intra prediction modes. The extended directional intra prediction modes may be applied to blocks having all sizes, and may be applied to both a luma component and a chroma component. However, this is an example, and embodiments of this document may be applied to a case where the number of intra prediction modes is different. A No. 67 intra prediction mode according to circumstances may be further used. The No. 67 intra prediction mode may indicate a linear model (LM) mode.

FIG. 10 illustrates 65 directional intra prediction modes.

Referring to FIG. 10, modes may be divided into intra prediction modes having horizontal directionality and intra prediction modes having vertical directionality based on a No. 34 intra prediction mode having a top left diagonal prediction direction. In FIG. 10, H and V mean horizontal directionality and vertical directionality, respectively. Each of numbers −32~32 indicate displacement of a 1/32 u nit on a sample grid position. The Nos. 2 to 33 intra prediction modes have horizontal directionality, and the Nos. 34 to 66 intra prediction modes have vertical directionality. The No. 18 intra prediction mode and the No. 50 intra prediction mode indicate a horizontal intra prediction mode and a vertical intra prediction mode, respectively. The No. 2 intra prediction mode may be called a bottom left diagonal intra prediction mode, the No. 34 intra prediction mode may be called a top left diagonal intra prediction mode, and the No. 66 intra prediction mode may be called a top right diagonal intra prediction mode.

As described above, in general, if block partitioning for a picture is performed, a current block and a neighboring block to be coded have similar image characteristics. Accordingly, there is a good probability that the current block and the neighboring block will have the same or similar intra prediction mode. According to such image characteristics, an intra prediction mode of a current block may be derived using an intra prediction mode of a neighboring block. This may be referred to as a most probable mode (MPM). That is, the MPM may mean a mode used to enhance coding efficiency by considering similarity between a current block and a neighboring block upon intra prediction mode coding.

For example, the encoding/decoding apparatus may configure a most probable mode (MPM) list for a current block. The MPM list may be indicated as an MPM candidate list. In this case, an MPM list including given MPM candidates may be configured by considering complexity in generating the MPM list. For example, an MPM list may include 3 MPM candidates, 5 candidates or 6 MPM candidates. In one embodiment, an MPM list may include MPM candidates derived based on an intra prediction mode of a neighboring block, a derived intra prediction mode and/or a default intra prediction mode. In this case, in deriving MPM candidates from the neighboring block, the encoding apparatus/decoding apparatus may derive an intra prediction mode of the neighboring block by searching neighboring blocks of a current block according to a specific order, and may use the intra prediction mode of the neighboring block as an MPM candidate based on the derived order. For example, the neighboring blocks may include at least one of the left neighboring block, top neighboring block, bottom left neighboring block, top right neighboring block, and top-left neighboring block of the current block. If an intra prediction mode of the current block is not included among the MPM candidates within the MPM list, a remaining mode may be used. In this case, the remaining mode is a mode using the remaining intra prediction modes except the MPM candidates, among all of intra prediction modes, and may code and signal remaining intra prediction mode information. The remaining intra prediction mode information may be information indicative of an intra prediction mode applied to a current block, among the remaining intra prediction modes except the MPM candidates. For example, if 67 intra prediction modes are used, the remaining intra prediction mode information may include a 6-bit syntax element (e.g., rem_intra_luma_pred_mode syntax element).

As described above, in the HEVC standard, 35 intra prediction modes are used upon intra prediction. In this case, an MPM list including 3 MPM candidates is configured. In this case, the 3 MPM candidates may be derived based on intra prediction modes of a neighboring block F and neighboring block G. Neighboring blocks of a current block including the neighboring block F and the neighboring block G may be the same as those described above.

Figure 11:
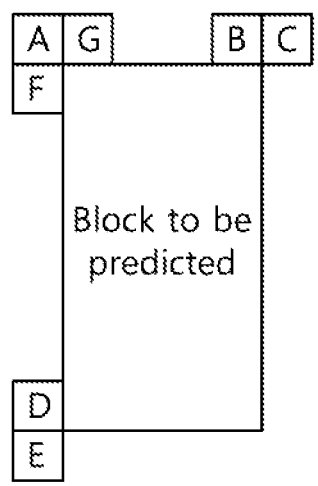
FIG. 11 illustrates neighboring blocks of a current block.

FIG. 11 illustrates neighboring blocks of a current block.

Referring to FIG. 11, neighboring blocks of a current block may include a neighboring block A, a neighboring block B, a neighboring block C, a neighboring block D, a neighboring block E, a neighboring block F and/or a neighboring block G.

In this case, the neighboring block A may indicate a neighboring block located on the top left side of a top-left sample position of a current block. The neighboring block B may indicate a neighboring block located on the upper side of a top right sample position of the current block. The neighboring block C may indicate a neighboring block located on the top right side of a top right sample position of the current block. The neighboring block D may indicate a neighboring block located on the left side of a bottom left sample position of the current block. The neighboring block E may indicate a neighboring block located on the bottom left of a bottom left sample position of the current block. The neighboring block G may indicate a neighboring block located on the upper side of a top-left sample position of the current block. The neighboring block F may indicate a neighboring block located on the left side of a top-left sample position of the current block.

For example, if the size of a current block is W×H and the x component and y component of the top-left sample position of the current block are 0, the neighboring block A may be a block including a sample at (−1, −1) coordinates, the neighboring block B may be a block including a sample at (W−1, −1) coordinates, the neighboring block C may be a block including a sample at (W, −1) coordinates, the neighboring block D may be a block including a sample at (−1, H−1) coordinates, the neighboring block E may be a block including a sample at (−1, H) coordinates, the neighboring block F may be a block including a sample at (−1, 0) coordinates, and the neighboring block G may be a block including a sample at (0, −1) coordinates.

According to the HEVC standard, 3 MPM candidates may be derived based on an intra prediction mode of the neighboring block F and an intra prediction mode of the neighboring block G. For example, the intra prediction mode of the neighboring block F and the intra prediction mode of the neighboring block G may be derived. Meanwhile, in the following case, an intra prediction mode of the neighboring block F or an intra prediction mode of the neighboring block G may be derived as a DC intra prediction mode.

1) If the neighboring block F or the neighboring block G is not available

2) If the neighboring block F or the neighboring block G is not coded as an intra prediction mode (i.e., if the neighboring block F or the neighboring block G is not an intra coded block)

3) If the neighboring block F or the neighboring block G is out of a current coding tree unit (CTU)

If an intra prediction mode of the neighboring block F or an intra prediction mode of the neighboring block G is determined as described above, 3 MPM candidates may be derived like Table 1.

TABLE 1

```
if (intra mode of F and G are equal)
{
    if (intra mode of F < intra mode 2)
    { MPM list1 }
    else
    { MPM list2 }
}
else
{
    if (Neither intra mode of F nor G are intra mode Planar)
    { MPM list3 }
```

TABLE 1-continued

```
        else if (intra mode of (F+G) <intra mode 2)
        { MPM list4 }
        else
        { MPM list5 }
}
```

Table 1 illustrates a schematic algorithm (i.e., pseudo code) for configuring an MPM list. Referring to Table 1, whether the intra prediction mode of the neighboring block F and the intra prediction mode of the neighboring block G are equal may be determined.

If an intra prediction mode of the neighboring block F and an intra prediction mode of the neighboring block G are equal and the mode number of an intra prediction mode of the neighboring block F is smaller than 2, the MPM list of the current block may be derived as an MPM list 1 (MPM list1). That is, if an intra prediction mode of the neighboring block F and an intra prediction mode of the neighboring block G are equal and the intra prediction mode of the neighboring block F is the intra prediction mode of the mode number 0 or the intra prediction mode of the mode number 1, the MPM list of the current block may be derived as the MPM list 1. In this case, the MPM list 1 may indicate an MPM list configured with MPM candidates {F, F−1, F+1}. F may indicate the intra prediction mode of the neighboring block F. F−1 may indicate an intra prediction mode in which a value obtained by subtracting 1 from the mode number of an intra prediction mode of the neighboring block F is a mode number. F+1 may indicate an intra prediction mode in which a value obtained by adding 1 to the mode number of an intra prediction mode of the neighboring block F is a mode number. For example, if the intra prediction mode of the neighboring block F is the intra prediction mode of the mode number N, the MPM list 1 may be configured with an MPM list, including the intra prediction mode of the mode number N, the intra prediction mode of the mode number N−1, and the intra prediction mode of the mode number N+1 as MPM candidates.

Furthermore, if an intra prediction mode of the neighboring block F and an intra prediction mode of the neighboring block G are equal and the mode number of an intra prediction mode of the neighboring block F is not smaller than 2, the MPM list of the current block may be derived as an MPM list 2 (MPM list2).

Furthermore, if an intra prediction mode of the neighboring block F and an intra prediction mode of the neighboring block G are not equal and the intra prediction mode of the neighboring block F and the intra prediction mode of the neighboring block G are not planar mode intra prediction modes, the MPM list of the current block may be derived as an MPM list 3 (MPM list3).

Furthermore, if an intra prediction mode of the neighboring block F and an intra prediction mode of the neighboring block G are not equal and the sum of the mode number of an intra prediction mode of the neighboring block F and the mode number of an intra prediction mode of the neighboring block G is smaller than 2, the MPM list of the current block may be derived as an MPM list 4 (MPM list4).

Furthermore, if an intra prediction mode of the neighboring block F and an intra prediction mode of the neighboring block G are not equal and at least one of the intra prediction mode of the neighboring block F and the intra prediction mode of the neighboring block G is a planar mode intra prediction mode and the sum of the mode number of an intra prediction mode of the neighboring block F and the mode number of an intra prediction mode of the neighboring block G is not smaller than 2, the MPM list of the current block may be derived as an MPM list 5 (MPM list5).

Meanwhile, as the number of intra prediction modes increases, the number of MPM candidates needs to be increased. Accordingly, the number of MPM candidates may be different depending on the number of intra prediction modes. In general, when the number of intra prediction modes increases, the number of MPM candidates may increase. However, the number of MPM candidates does not always increase when the number of intra prediction modes increases. For example, if 35 intra prediction modes are present or if 67 intra prediction modes are present, various numbers of MPM candidates, such as 3, 4, 5, and 6, may be present depending on the design.

For example, a 6-MPM list configuration may be performed. That is, an MPM list including 6 MPM candidates may be configured. For example, in the 6-MPM list configuration, a process of searching for the locations of various neighboring blocks and a consistent pruning check process for excluding the same intra prediction mode may be performed. For example, the order in which 6 MPM candidates are configured may be as follows:

The neighboring block D, the neighboring block B, the planar mode intra prediction mode, the DC intra prediction mode, the neighboring block E, the neighboring block C, and the neighboring block A.

That is, neighboring blocks may be derived as MPM candidate in order of an intra prediction mode of the neighboring block D, an intra prediction mode of the neighboring block B, the planar mode intra prediction mode, the DC intra prediction mode, an intra prediction mode of the neighboring block E, an intra prediction mode of the neighboring block C, and an intra prediction mode of the neighboring block A. If a prediction mode is the same as an already derived intra prediction mode, it may not be derived as an MPM candidate.

Furthermore, if an MPM list does not include an MPM candidate having a maximum number of candidates, that is, when the number of derived MPM candidates is smaller than a maximum number of candidates, a directional intra prediction mode neighboring a derived MPM candidate and a pre-defined default intra prediction mode may be considered as MPM candidates, and a pruning check process may be performed. In this case, the directional intra prediction mode neighboring the MPM candidate may indicate an intra prediction mode having a mode number neighboring that of the MPM candidate. The neighboring block search and the consistent pruning check have an advantage in the reduction of a bit transfer rate, but may increase the number of hardware operation cycles for the MPM list configuration of each block. The worst scenario is that a 3840×2160 4K image may be partitioned into 4×4 size blocks for an intra prediction. In this case, an increased hardware operation cycle for each of the 4×4 size blocks may be importantly considered in throughput. Meanwhile, if a neighboring block coded through an inter prediction is aware of an intra prediction mode of the neighboring block, the intra prediction mode of the neighboring block may be used for an MPM list configuration.

As described above, in configuring an MPM list, the encoding apparatus may determine the best intra prediction mode by optimizing the bit rate and distortion at the same time, and may code the determined best intra prediction mode as a bitstream. The decoding apparatus may parse (decode) the intra prediction mode included in the bitstream, and may perform an intra prediction based on the parsed intra prediction mode. However, in order to minimize signaling overhead as the number of intra prediction modes increases, efficient intra mode coding is necessary. Both the encoding apparatus and the decoding apparatus configure MPM lists using neighboring intra prediction modes of coded blocks. In this case, when the best intra prediction mode is one of candidates within the MPM list, overhead can be minimized by signaling an MPM index. The length of the MPM list and the method of configuring the MPM list may be different depending on an algorithm.

In this case, if the 67 intra prediction modes are used for an intra prediction, the MPM list including the existing 3 MPM candidates may not be sufficient to show the diversity of multiple intra prediction modes. Furthermore, a 6-MPM list configuration scheme including neighboring block search and a pruning check process may affect throughput because it is too complicated. Accordingly, embodiments of this document propose efficient the MPM list configuration method having a proper balance between complexity and coding efficiency.

Figure 12:
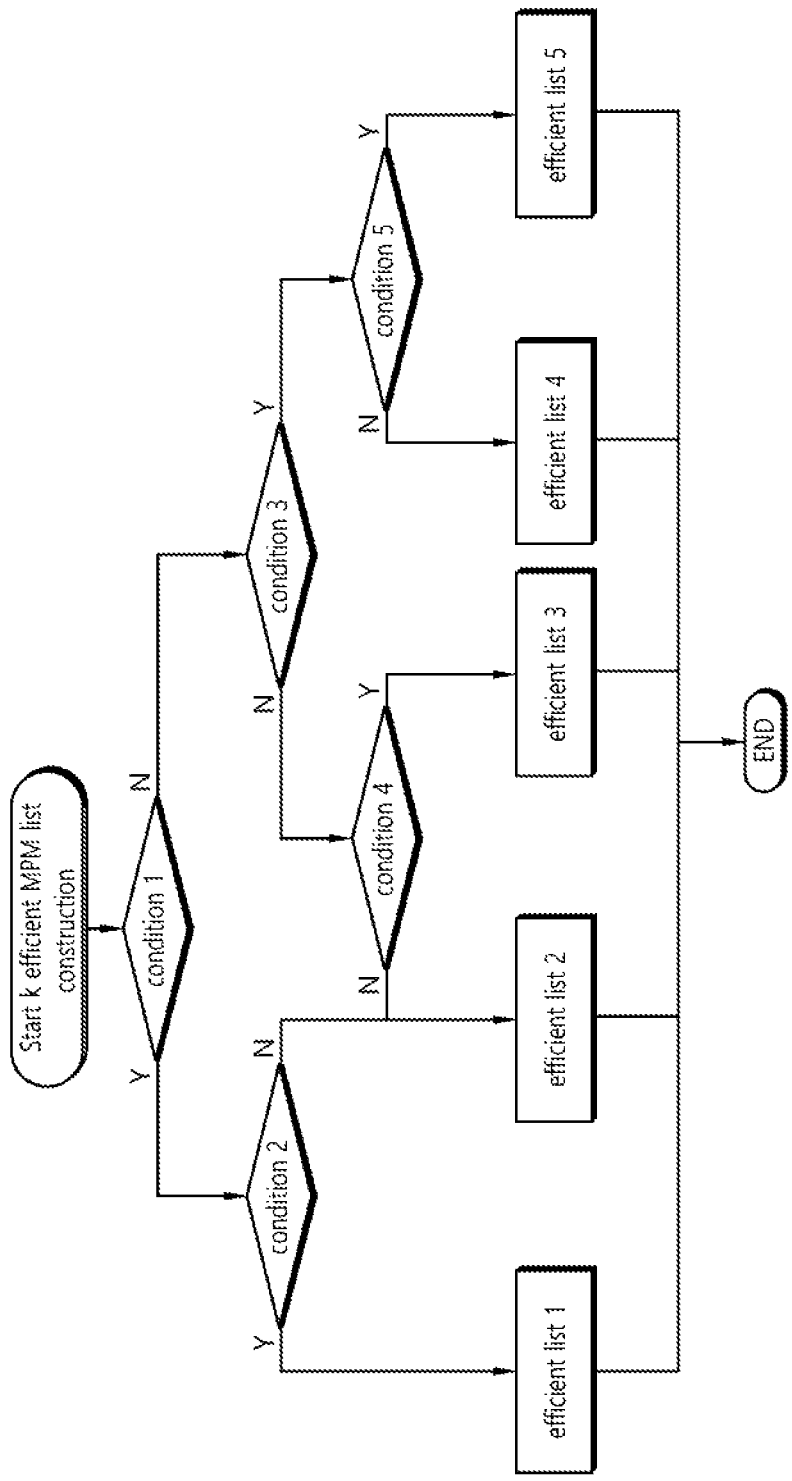
FIGS. 12 and 13 are flowcharts schematically illustrating a method of configuring an MPM list for a current block.
Figure 13:
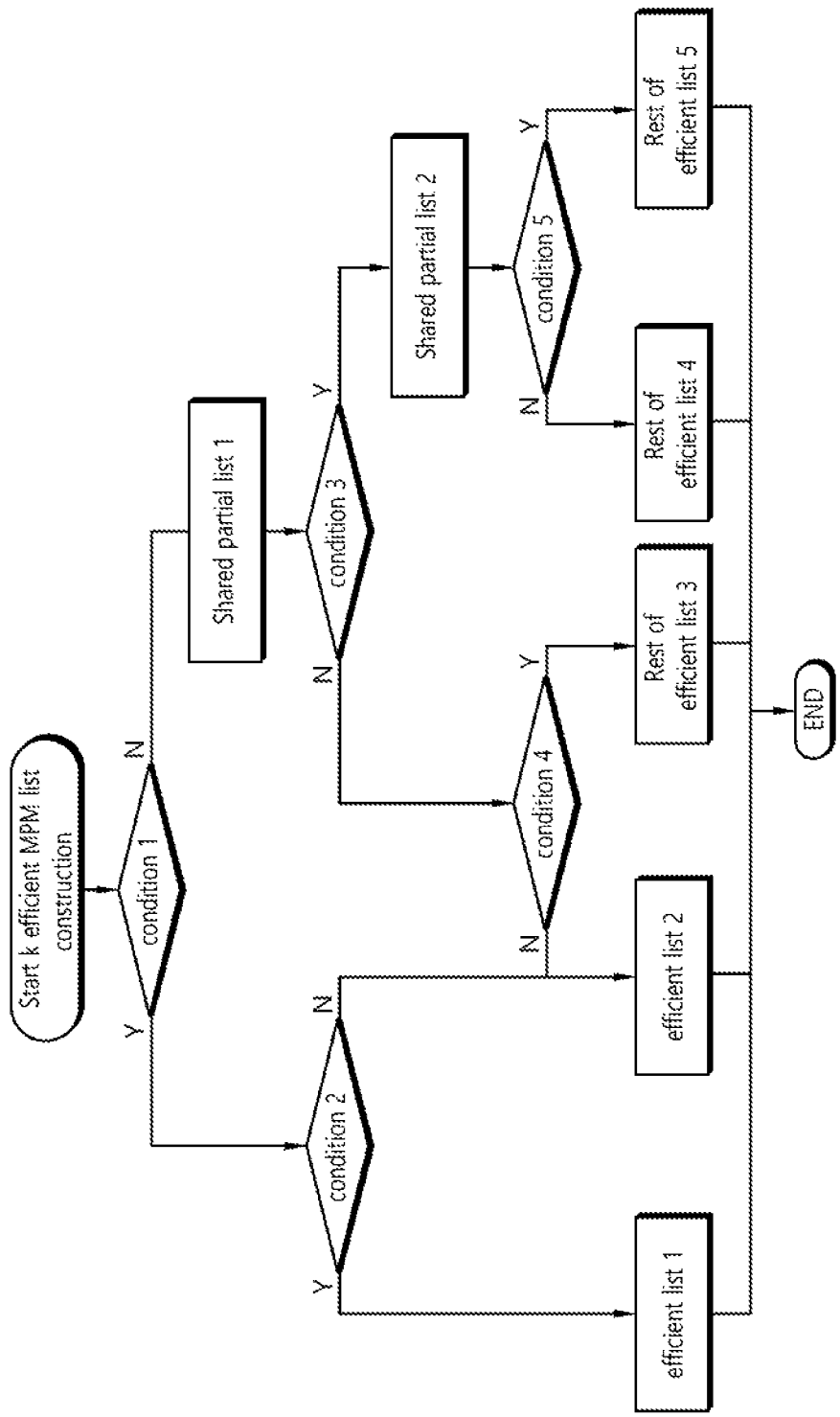

FIGS. 12 and 13 are flowcharts schematically illustrating a method of configuring an MPM list for a current block.

Referring to FIGS. 12 and 13, an MPM list for a current block including k MPM candidates may be configured. In this case, k may indicate the length of the MPM list, that is, the number of MPM candidates included in the MPM list. According to the embodiments disclosed in FIGS. 12 and 13, 5 efficient MPM lists (MPM list 1~MPM list 5) may be configured based on five conditions. That is, one of the 5 MPM lists may be derived as an MPM list for the current block based on the five conditions. The MPM lists may be independent lists as illustrated in FIG. 12, and may be lists having partially shared portions as illustrated in FIG. 13. If a partial list shared as in FIG. 13 is used, a duplication process can be avoided. The conditions 5 may be modeled so that the sum of the probabilities of all the conditions become 1.

Figure 14:
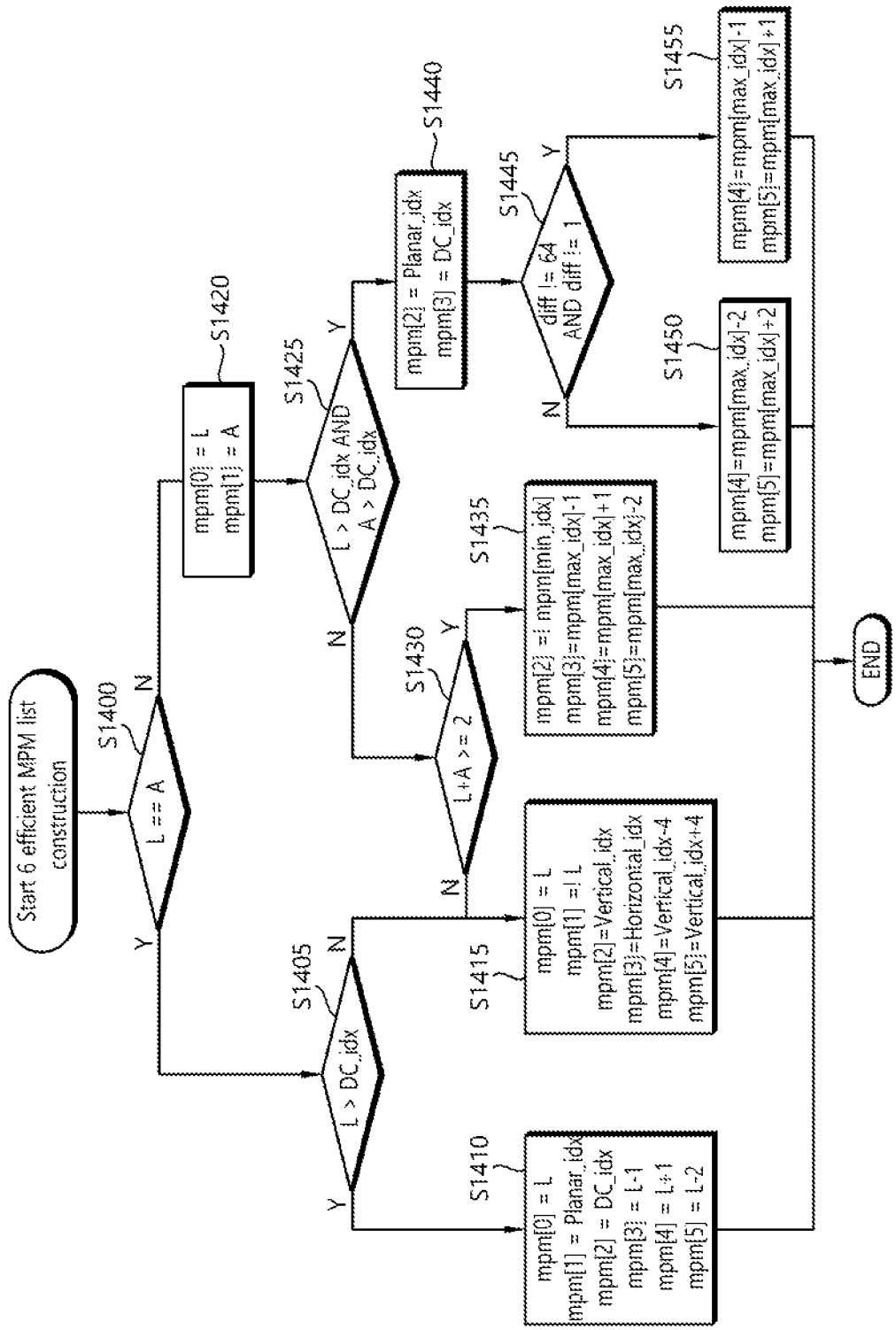
FIG. 14 is a flowchart illustrating an embodiment of a method of configuring an MPM list for a current block.

FIG. 14 is a flowchart illustrating an embodiment of a method of configuring an MPM list for a current block.

FIG. 14 illustrates a method of efficiently configuring an MPM list for a current block including k MPM candidates based on a neighboring block located adjacent to the current block. For example, k may be 6, and five conditions may be used in order to configure an MPM list for the current block among 5 efficient lists. In FIG. 14, L may indicate an intra prediction mode of the neighboring block B illustrated in FIG. 11, and A may indicate an intra prediction mode of the neighboring block D illustrated in FIG. 11. Alternatively, in contrast, L may indicate an intra prediction mode of the neighboring block D illustrated in FIG. 11, and A may indicate an intra prediction mode of the neighboring block B illustrated in FIG. 11. In FIG. 14, a symbol "!" is a negative logic operator, and may refer to an operator "not" that converts a value that is not true into a true value and the vice versa. For example, !7 may indicate a value 0, and !0 may indicate a value 1.

Referring to FIG. 14, the encoding/decoding apparatus may check a condition 1 for determining whether L and A are equal (S1400). That is, the encoding/decoding apparatus may determine whether L and A are the same intra prediction mode. The condition 1 may be a condition for determining whether "L==A".

If L and A are the same intra prediction mode (i.e., when the condition 1 is satisfied), the encoding/decoding apparatus may check a condition 2 for determining whether L (or A) is a directional intra prediction mode (S1405). That is, the encoding/decoding apparatus may determine whether L and A are equal and the mode number of L (or A) is greater than the mode number of a DC mode. The condition 2 may be a condition for determining whether "L>DC_idx".

When the condition 2 is satisfied, the encoding/decoding apparatus may derive an MPM list 1 as an MPM list for the current block (S1410). When the condition 2 is not satisfied, the encoding/decoding apparatus may derive an MPM list 2 as an MPM list for the current block (S1415).

In this case, the MPM list 1 may be configured like Table 2, and the MPM list 2 may be configured like Table 3.

TABLE 2 mpm[0] = L
mpm[2] = Planar_idx
mpm[3] = DC_idx
mpm[3] = L − 1
mpm[4] = L + 1
mpm[5] = L − 2

TABLE 3 mpm[0] = L
mpm[1] = ! L
mpm[2] = Vertical_idx
mpm[3] = Horizontal_idx
mpm[4] = Vertical_idx − 4
mpm[5] = Vertical_idx + 4

Referring to Table 2 and Table 3, the MPM list 1 may include a first MPM candidate (mpm[0]) to a sixth MPM candidate (mpm[5]) as in Table 2, The MPM list 2 may include a first MPM candidate (mpm[0]) to a sixth MPM candidate (mpm[5]) as in Table 3. In this case, the first to sixth MPM candidates may indicate intra prediction modes (i.e., mode numbers) indicated by respective MPM index values 0 to 5. For example, the first MPM candidate indicates an intra prediction mode assigned to mpm[0], and may be indicated the value 0 of an MPM index.

If L and A are not the same intra prediction mode (i.e., when the condition 1 is not satisfied), the encoding/decoding apparatus may derive a partially shared MPM list 1 (S1420).

In this case, the partially shared MPM list 1 may be configured like Table 4.

TABLE 4 mpm[0] = L
mpm[1] = A
If L > A, max_idx is 0 and min_idx is 1.
Otherwise, max_idx is 1 and min_idx is 0.

Referring to Table 4, the partially shared MPM list 1 may include a first MPM candidate (mpm[0]) indicative of L and a second MPM candidate (mpm[1]) indicative of A. That is, if L and A are not equal, the encoding/decoding apparatus may first add L and A to the MPM list. Accordingly, MPM lists 3, 4, and 5 to be described later may be configured to partially include the first MPM candidate (mpm[0]) and the second MPM candidate (mpm[1]) as in Table 4. In this case, in deriving the first MPM candidate (mpm[0]) and the second MPM candidate (mpm[1]), an MPM index order may be determined by comparing the sizes of the mode numbers of L and A. For example, referring to Table 4, when L has a greater mode number than A, a max_idx value indicative of L may be set to 0, and a min_idx value indicative of A may be set to 1. When L has a smaller mode number than A, max_idx and min_idx values may be inversely set.

Next, the encoding/decoding apparatus may check a condition 3 for determining whether both L and A are directional intra prediction modes (S1425). That is, the encoding/decoding apparatus may determine whether L and A are not equal and the mode number of each of L and A is greater than a DC mode number. The condition 3 may be a condition for determining whether "L>DC_idx AND A>DC_idx".

If each of L and A has a greater mode number than the DC mode (i.e., when the condition 3 is satisfied), the encoding/decoding apparatus may derive a partially shared MPM list 2 (S1440).

In this case, the partially shared MPM list 2 may be configured like Table 5.

TABLE 5 mpm[2] = Planar_idx
mpm[3] = DC_idx
diff = mpm[max_idx] − mpm[min_idx]

Referring to Table 5, the partially shared MPM list 2 may include a third MPM candidate (mpm[2]) indicative of a planar mode and a fourth MPM candidate (mpm[3]) indicative of a DC mode. That is, if the condition 3 is satisfied, this means that both L and A are directional intra prediction modes. Accordingly, the encoding/decoding apparatus may add the planar mode and the DC mode, that is, not directional intra prediction modes, to the MPM list as the third MPM candidate (mpm[2]) and the fourth MPM candidate (mpm[3]) after the first MPM candidate (mpm[0]=L) and the second MPM candidate (mpm[1]=A) included in the partially shared MPM list 1 described in Table 4. Accordingly, MPM lists 4 and 5 to be described later may be configured to partially include the third MPM candidate (mpm[2]) and the fourth MPM candidate (mpm[3]) in Table 5 along with the first MPM candidate (mpm[0]) and the second MPM candidate (mpm[1]) in Table 4.

Next, the encoding/decoding apparatus may check a condition 4 for determining whether a difference between the mode number of L and the mode number of A is not 64 and not 1 (S1445). The condition 4 may be a condition for determining whether "diff !=64 AND diff !=1".

For example, the difference (diff) between the mode number of L and the mode number of A may be calculated like an equation illustrated in Table 5. In this case, diff may be a result obtained by subtracting a smaller value from a greater value in the mode number of L and the mode number of A.

In this case, when the condition 4 is satisfied, the encoding/decoding apparatus may derive an MPM list 5 as an MPM list for the current block (S1455). When the condition 4 is not satisfied, the encoding/decoding apparatus may derive an MPM list 4 as an MPM list for the current block (S1450).

In this case, the MPM list 4 may be configured like Table 6, and the MPM list 5 may be configured like Table 7.

TABLE 6 mpm[4] = mpm[max_idx] − 2
mpm[5] = mpm[max_idx] + 2

TABLE 7 mpm[4] = mpm[max_idx] − 1
mpm[5] = mpm[max_idx] + 1

Each of the MPM list 4 of Table 6 and the MPM list 5 of Table 7 may be configured to include a fifth MPM candidate (mpm[4]) and a sixth MPM candidate (mpm[5]) along with the first to fourth MPM candidates (mpm[0]~mpm[3]) described in Table 4 and Table 5.

Meanwhile, if at least one of L and A is a non-directional intra prediction mode at step S1425 (i.e., when the condition 3 is not satisfied), the encoding/decoding apparatus may check a condition 5 for determining whether only any one of L and A is a non-directional intra prediction mode (S1430). That is, the encoding/decoding apparatus may determine whether at least one of L and A is a DC mode number or less and the sum of the mode number of L and the mode number of A is 2 or more. The condition 5 may be a condition for determining whether "L+A>=2".

When the sum of the mode number of L and the mode number of A is 2 or more (i.e., when the condition 5 is satisfied), the encoding/decoding apparatus may derive an MPM list 3 as an MPM list for the current block (S1435).

In this case, the MPM list 3 may be configured like Table 8.

TABLE 8 mpm[2] = ! mpm[min_idx]
mpm[3] = mpm[max_idx] − 1
mpm[4] = mpm[max_idx] + 1
mpm[5] = mpm[max_idx] − 2

Referring to Table 8, the MPM list 3 may be configured to include third to sixth MPM candidates (mpm[2]~mpm[5]) along with the first MPM candidate (mpm[0]) and the second MPM candidate (mpm[1]) described in Table 4. In this case, to satisfy the condition 5 may mean that any one of L and A is a directional prediction mode and the other is a non-directional prediction mode. Accordingly, the MPM list 3 may include a non-directional prediction mode as the third MPM candidate (mpm[2]) after the first and second MPM candidates. For example, if one having a non-directional mode, among L and A, is a planar mode, the third MPM candidate (mpm[2]) may be derived as a DC mode. Alternatively, if one having a non-directional mode, among L and A, is a DC mode, the third MPM candidate (mpm[2]) may be derived as a planar mode.

When the sum of the mode number of L and the mode number of A is not 2 or more (i.e., when the condition 5 is not satisfied), the encoding/decoding apparatus may derive an MPM list 2 as an MPM list for the current block (S1415). In this case, both L and A may be non-directional prediction modes.

In this case, the MPM list 2 may be the same as Table 3. Referring to Table 3, since both L and A are non-directional prediction modes, in the MPM list 2, a planar mode and a DC mode may be derived as the first MPM candidate (mpm[0]) and the second MPM candidate (mpm[1]), respectively. The remaining third to sixth MPM candidates (mpm[2]~mpm[5]) may be derived as illustrated in Table 3.

In Table 2 to Table 8, in (directional intra prediction mode+1), (directional intra prediction mode−1), (directional intra prediction mode+2), (directional intra prediction mode−2), etc., a value may be mathematically added or subtracted. However, in some cases, mathematical calculation may not be simply performed. For example, in a non-directional intra prediction mode, the consistency of a neighboring intra prediction mode may not be maintained by subtracting or adding a directional intra prediction mode or a maximum available intra prediction mode index may be exceeded. For example, a value obtained by subtracting 1 from a directional intra prediction mode may be derived as an intra mode 1 indicative of a DC index (DC mode). 67 is obtained by adding 1 to the No. 66 directional intra prediction mode, and thus it exceeds the index 66 of a maximum available intra mode. Accordingly, an operation of adding or subtracting a mode may be limited as follows using a modular arithmetic (indicated by %). That is, a value indicative of a non-directional intra prediction mode that does not consistency or a value that exceeds a maximum available intra mode index can be prevented from being derived. For example, the adding or subtracting of a mode using the modular arithmetic may be derived like Table 9.

TABLE 9

Intra mode − 1: (Intra mode + 62) % 65 + 2
Intra mode + 1: (Intra mode − 1) % 65 + 2
Intra mode − 2: (Intra mode + 61) % 65 + 2
Intra mode + 2: (Intra mode) % 65 + 2

Figure 15:
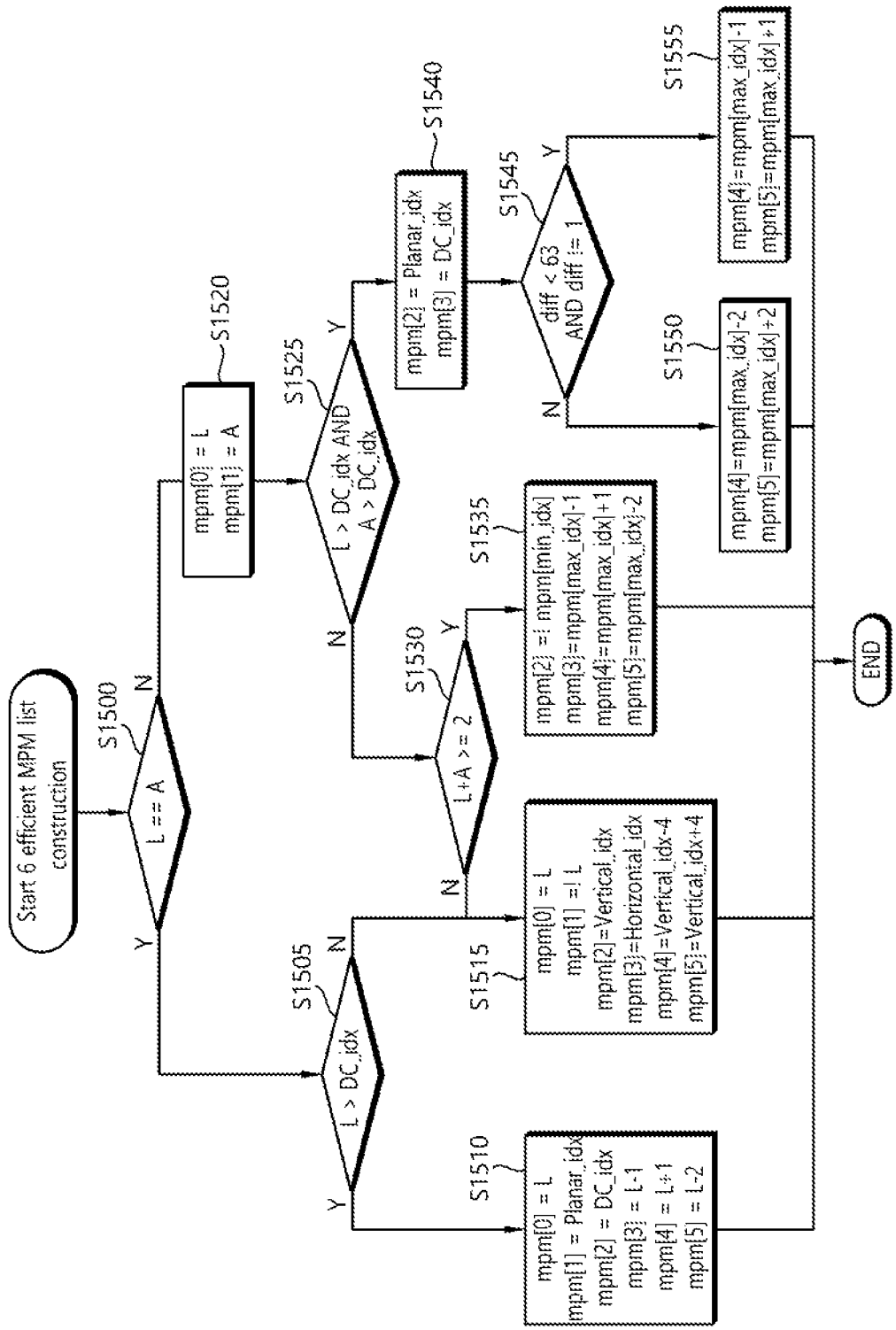
FIG. 15 is a flowchart illustrating another embodiment of a method of configuring an MPM list for a current block.

FIG. 15 is a flowchart illustrating another embodiment of a method of configuring an MPM list for a current block.

FIG. 15 illustrates a method of efficiently configuring an MPM list for a current block including k MPM candidates based on a neighboring located adjacent to the current block. For example, k may be 6, and five conditions may be used to configure an MPM list for the current block among 5 efficient lists. In FIG. 15, L may indicate an intra prediction mode of the neighboring block B illustrated in FIG. 11, and A may indicate an intra prediction mode of the neighboring block D illustrated in FIG. 11. Alternatively, in contrast, L may indicate an intra prediction mode of the neighboring block D illustrated in FIG. 11, and A may indicate an intra prediction mode of the neighboring block B illustrated in FIG. 11. In FIG. 15, a symbol "!" is a negative logic operator, and may refer to an operator "not" that converts a value that is not true into a true value and the vice versa. For example, !7 may indicate a value 0, and !0 may indicate a value 1.

Furthermore, the MPM list configuration method according to the embodiment of FIG. 15 is similar to that of FIG. 14, and corresponds to a case where a condition used to configure the MPM list is different. Accordingly, in the embodiment of FIG. 15, a detailed description that overlaps that of FIG. 14 is omitted, and only a different configuration is described.

The encoding/decoding apparatus checks a condition 1 for determining whether L and A are equal (S1500). If L and A are the same intra prediction mode, the encoding/decoding apparatus may check a condition 2 for determining whether L (or A) is a directional intra prediction mode (S1510). The condition 1 may be a condition for determining whether "L==A", and a condition 2 may be a condition for determining whether "L>DC_idx".

When the condition 1 and the condition 2 are satisfied, the encoding/decoding apparatus may configure an MPM list 1 by deriving a first MPM candidate (mpm[0]) to a sixth MPM candidate (mpm[5]) like Table 2 (S1510).

Alternatively, when the condition 1 is satisfied and the condition 2 is not satisfied, the encoding/decoding apparatus may configure an MPM list 2 by deriving a first MPM candidate (mpm[0]) to a sixth MPM candidate (mpm[5]) like Table 3 (S1515).

In the determination step S1500 of the condition 1, if it is determined that L and A are not the same intra prediction mode, the encoding/decoding apparatus may configure a partially shared MPM list 1 by deriving a first MPM candidate (mpm[0]) indicative of L and a second MPM candidate (mpm[1]) indicative of A like Table 4 (S1520). Furthermore, the encoding/decoding apparatus may check a condition 3 for determining whether both L and A are directional intra prediction modes (S1525), and may derive the remaining MPM candidates (mpm[2]~mpm[5]) based on whether the condition 3 is satisfied. The condition 3 may be a condition for determining whether "L>DC_idx AND A>DC_idx".

In this case, when the condition 3 is satisfied, the encoding/decoding apparatus may derive a third MPM candidate (mpm[2]) indicative of a planar mode and a fourth MPM candidate (mpm[3]) indicative of a DC mode like Table 5, and may configure a partially shared MPM list 2 (S1540). Furthermore, if both L and A are directional intra prediction modes, the encoding/decoding apparatus may check a condition 4 for determining whether a difference (diff) between the mode numbers of L and A is smaller than 63 and is not 1 (S1545). The condition 4 may be a condition for determining whether "diff<63 AND diff !=1".

When the condition 4 is satisfied, the encoding/decoding apparatus may configure an MPM list 5 by deriving a fifth MPM candidate (mpm[4]) and a sixth MPM candidate (mpm[5]) like Table 7 (S1555).

Alternatively, when the condition 4 is not satisfied, the encoding/decoding apparatus may configure an MPM list 4 by deriving a fifth MPM candidate (mpm[4]) and a sixth MPM candidate (mpm[5]) like Table 6 (S1550).

In this case, the MPM list 4 and the MPM list 5 may be configured to include the fifth MPM candidate (mpm[4]) and the sixth MPM candidate (mpm[5]) along with the first to fourth MPM candidates (mpm[0]~mpm[3]) described in Table 4 and Table 5.

Meanwhile, in the determination step S1525 of the condition 3, if it is determined that at least one of L and A is a non-directional intra prediction mode, the encoding/decoding apparatus may check a condition 5 for determining whether only any one of L and A is a non-directional intra prediction mode (S1530). That is, the encoding/decoding apparatus may determine whether at least one of L and A is a DC mode number or less and the sum of the mode number of L and the mode number of A is 2 or more. The condition 5 may be a condition for determining whether "L+A>=2".

When the sum of the mode number of L and the mode number of A is 2 or more (i.e., when the condition 5 is satisfied), the encoding/decoding apparatus may configure an MPM list 3 by deriving a third MPM candidate (mpm[2]) and a sixth MPM candidate (mpm[5]) like Table 8 (S1535).

In this case, the MPM list 3 may be configured to include the remaining MPM candidates (mpm[2]~ mpm[5]) along with the first MPM candidate (mpm[0]) and the second MPM candidate (mpm[1]) described in Table 4.

When the sum of the mode number of L and the mode number of A is not 2 or more (i.e., when the condition 5 is not satisfied), the encoding/decoding apparatus may configure an MPM list 2 by deriving MPM candidates (mpm[0]~mpm[5]) like Table 3 (S1515).

The method of configuring an MPM list in the aforementioned embodiments may be performed in the encoding/decoding apparatus. In this case, in configuring the MPM list, the encoding apparatus may derive the best intra prediction mode to be applied to a current block, and may determine whether the derived best intra prediction mode belongs to an MPM list including MPM candidates configured using a method, such as those of the aforementioned embodiments. If an intra prediction mode of a current block belongs to an MPM list including MPM candidates, the encoding apparatus may encode an MPM flag and an MPM index. In this case, the MPM flag may indicate whether the intra prediction mode of the current block belongs to the MPM list (i.e., MPM candidates). The MPM index may indicate whether which MPM mode is applied as the intra prediction mode of the current block, among the MPM candidates included in the MPM list. In contrast, if the intra prediction mode of the current block does not belong to the MPM list including the MPM candidates, the encoding apparatus may encode the intra prediction mode of the current block.

The decoding apparatus may configure an MPM list by applying the same method as that of the aforementioned embodiments identically with the encoding apparatus. Furthermore, the decoding apparatus may receive an MPM flag from the encoding apparatus, and may identify whether an intra prediction mode applied to a current block is included in an MPM list (i.e., MPM candidates) using the MPM flag. If the intra prediction mode applied to the current block is included within the MPM list (i.e., MPM candidates), the decoding apparatus may derive an intra prediction mode applied to the current block using an MPM index received from the encoding apparatus. In contrast, if the intra prediction mode applied to the current block is not included in the MPM list (i.e., MPM candidates), the decoding apparatus may derive an intra prediction mode applied to the current block using a prediction mode index (or, remaining prediction mode index; remaining mode information) indicative of a specific prediction mode, among remaining prediction modes except the MPM candidates.

Hereinafter, there is proposed a method of configuring an extended MPM list having similar complexity by comparing the extended MPM list with an MPM list including 3 MPM candidates. The extended MPM list refers to a MPM list including three or more MPM candidates, and may include 3, 4, 5 or 6 MPM candidates, for example. In a proposed method to be described later, an embodiment in which an MPM list including 6 MPM candidates is generated using two neighboring intra prediction modes (left neighboring intra prediction mode and above neighboring intra prediction mode). In this case, the left neighboring intra prediction mode (LEFT) may indicate an intra prediction mode of the neighboring block D in FIG. 11, and the above neighboring intra prediction mode (ABOVE) may indicate an intra prediction mode of the neighboring block B in FIG. 11.

In configuring the extended MPM list, the reason for the 3 MPM candidates are used is that there are advantages in simplicity and throughput. However, complexity may be increased because the existing method using 6 MPM candidates includes a process of searching for the locations of various neighboring blocks, a continuous pruning process, steps for generating the MPM list, line buffer requirements and parsing dependency. Accordingly, as in the method using 3 MPM candidates, there is proposed a method capable of obtaining advantages in complexity and throughput even in using 6 MPM candidates.

In one embodiment, an MPM list may be configured based on an algorithm (i.e., pseudo code), such as Table 10.

TABLE 10

Determine LEFT and ABOVE intra modes
Set MPM as MPM_ordering_0
If (LEFT==ABOVE)
  If (LEFT>=DC_idx), then set MPM as MPM_ordering_1

TABLE 10-continued

Else if (LEFT>DC_idx and ABOVE>DC_idx), then set MPM as MPM_ordering_2
  Else if (LEFT+ABOVE> DC_idx), then set MPM as MPM_ordering_3

Referring to Table 10, the MPM list of a current block may be generated based on LEFT and ABOVE, that is, neighboring intra prediction modes. In this case, LEFT may indicate an intra prediction mode of the neighboring block D in FIG. 11, and ABOVE may indicate an intra prediction mode of the neighboring block B in FIG. 11. Furthermore, the neighboring block D may indicate a left neighboring block located on the downmost side, among left neighboring blocks neighboring the left of the current block. The neighboring block B may indicate a top neighboring block located on the far right side, among neighboring blocks neighboring the top of the current block.

Specifically, intra prediction modes of LEFT and ABOVE may be derived. Furthermore, the MPM list (i.e., MPM candidates) of a current block may be set as MPM_ordering_0 based on the intra prediction modes of LEFT and ABOVE. In this case, if LEFT and ABOVE are equal and the mode number of LEFT is greater than or equal to a DC mode, the MPM list (i.e., MPM candidates) of the current block may be set as MPM_ordering_1. Alternatively, if LEFT and ABOVE are not equal and the mode number of LEFT is greater than that of a DC mode and the mode number of ABOVE is greater than that of a DC mode, the MPM list (i.e., MPM candidates) of the current block may be set as MPM_ordering_2. Alternatively, if LEFT and ABOVE are not equal, at least one of the mode number of LEFT and the mode number of ABOVE is not greater than that of a DC mode, and the sum of the mode number of LEFT and the mode number of ABOVE is greater than the mode number of a DC mode, the MPM list (i.e., MPM candidates) of the current block may be set as MPM_ordering_3.

In this case, MPM_ordering_0, MPM_ordering_1, MPM_ordering_2, or MPM_ordering_3 may have been configured to include MPM candidates according to a predetermined order as described in FIGS. 12 to 15.

Furthermore, if one of the remaining intra prediction modes except derived MPM candidates is an intra prediction mode applied to a current block as described above, the MPM coding of the current block may be performed based on remaining mode information. Such remaining mode information may be encoded/decoded by applying truncated binary (TB) coding. If the TB coding is applied, the remaining mode information may be used to variably generate bits from 1 bit to 5 bits and may be subjected to binarization processing. Accordingly, in deriving the remaining mode information, the number of bits can be reduced and coding efficiency can be enhanced by performing TB binarization processing.

In another embodiment, an MPM list may be configured based on an algorithm (i.e., spec), such as Table 11 shown in FIG. 19.

Referring to Table 11, candidate intra prediction modes may be derived based on a neighboring block of a current block. An MPM list for the current block may be configured based on the candidate intra prediction modes. The candidate intra prediction modes may include a candidate intra prediction mode A and a candidate intra prediction mode B.

For example, when at least one of conditions to be described later is true (i.e., when at least one of conditions to be described later is satisfied, the candidate intra prediction mode A may be set as a planar mode intra prediction mode.

A neighboring block A is not available

An intra prediction is not applied to the neighboring block A

In this case, the neighboring block A may be a left neighboring block of a current block. The left neighboring block may be a left neighboring block located on the downmost side, among left neighboring blocks neighboring the current block. For example, if the size of a current block is cbWidth×cbHeight and an x component and y component at the top-left sample position of the current block are xCb and yCb, the neighboring block A may be a block including a sample at (xCb−1, yCb+cbHeight−1) coordinates. Meanwhile, the neighboring block A may indicate the neighboring block D of FIG. 11.

When all the conditions are not true (i.e., when all the conditions are not satisfied), the candidate intra prediction mode A may be set as an intra prediction mode of the neighboring block A.

Furthermore, for example, when at least one of conditions to be described later is true (i.e., when at least one of the conditions to be described later is satisfied, the candidate intra prediction mode B may be set as a planar mode intra prediction mode.

A neighboring block B is not available

An intra prediction is not applied to the neighboring block B yCb−1 is smaller than ((yCb>>CtbLog2SizeY)<<CtbLog2SizeY)

In this case, the neighboring block B may be a top neighboring block of the current block. The top neighboring block may be a top neighboring block located on the far right side among top neighboring blocks neighboring the current block. For example, if the size of a current block is cbWidth x cbHeight and an x component and y component at the top-left sample position of the current block are xCb and yCb, the neighboring block B may be a block including a sample at (xCb+cbWidth−1, yCb−1) coordinates. Meanwhile, CtbLog2SizeY may indicate the size of a current CTU, and ((yCb>>CtbLog2SizeY)<<CtbLog2SizeY) may indicate coordinates at the top boundary of the current CTU. That is, a case where yCb−1 is smaller than ((yCb>>CtbLog2SizeY)<<CtbLog2SizeY) may indicate a case where the neighboring block B is out of the range of the current CTU. That is, the aforementioned condition may indicate a case where the neighboring block B is out of the range of the current CTU.

When all the conditions are not true (i.e., when all the conditions are not satisfied), the candidate intra prediction mode B may be set as an intra prediction mode of the neighboring block B.

If candidate intra prediction modes have been derived, the MPM list of the current block may be configured like a first MPM list. The first MPM list may be configured with a first MPM candidate indicative of a candidate intra prediction mode A, a second MPM candidate indicative of the intra prediction mode of a value obtained by performing an operation on the candidate intra prediction mode A using a negative logic operator, a third MPM candidate indicative of the No. 50 intra prediction mode, a fourth MPM candidate indicative of the No. 18 intra prediction mode, a fifth MPM candidate indicative of the No. 46 intra prediction mode, and a sixth MPM candidate indicative of the No. 54 intra prediction mode.

Thereafter, whether the candidate intra prediction mode B and the candidate intra prediction mode A are equal may be determined.

In this case, if the candidate intra prediction mode B and the candidate intra prediction mode A are equal, whether the candidate intra prediction mode A is larger than 1 may be determined. When the candidate intra prediction mode A is larger than 1, the MPM list of the current block may be configured like a second MPM list. The second MPM list may be configured with a first MPM candidate indicative of the candidate intra prediction mode A, a second MPM candidate indicative of a planar mode intra prediction mode, a third MPM candidate indicative of a DC intra prediction mode, a fourth MPM candidate indicative of an intra prediction mode derived as 2+((candIntraPredModeA+62) % 65), a fifth MPM candidate indicative of an intra prediction mode derived as 2+((candIntraPredModeA−1) % 65), and a sixth MPM candidate indicative of an intra prediction mode derived as 2+((candIntraPredModeA+61) % 65).

Otherwise, if the candidate intra prediction mode B and the candidate intra prediction mode A are not equal, first, the first MPM candidate and second MPM candidate of the current block may be derived. The first MPM candidate may be derived as the candidate intra prediction mode A, and the second MPM candidate may be derived as the candidate intra prediction mode B. Furthermore, biggerIdx may be set. When the first MPM candidate is greater than the second MPM candidate, biggerIdx may be derived as 0. When the first MPM candidate is not greater than the second MPM candidate, biggerIdx may be derived as 1.

Next, whether the candidate intra prediction mode A and the candidate intra prediction mode B are larger than 1 may be determined (i.e., whether the mode number of the candidate intra prediction mode A and the mode number of the candidate intra prediction mode B are larger than 1 may be determined). In this case, when the candidate intra prediction mode A and the candidate intra prediction mode B are larger than 1, the third MPM candidate and fourth MPM candidate of the current block may be derived. The third MPM candidate may be derived as a planar mode intra prediction mode, and the fourth MPM candidate may be derived as a DC intra prediction mode.

Next, whether a difference (diff) between an MPM candidate indicated by an MPM index having a value of biggerIdx and an MPM candidate indicated by an MPM index having a value (i.e., !biggerIdx) obtained by performing an operation on biggerIdx using a negative logic operator is not 64 and also not 1 may be determined.

When the difference is not 64 and also not 1, the fifth MPM candidate and sixth MPM candidate of the current block may be derived. The fifth MPM candidate may be derived as an intra prediction mode derived as 2+((candModeList[biggerIdx]+62) % 65). The sixth MPM candidate may be derived as an intra prediction mode derived as 2+((candModeList[biggerIdx]−1) % 65).

Otherwise, if the difference is 64 or 1, the fifth MPM candidate and sixth MPM candidate of the current block may be derived. The fifth MPM candidate may be derived as an intra prediction mode derived as 2+((candModeList[biggerIdx]+61) % 65). The sixth MPM candidate may be derived as an intra prediction mode derived as 2+(candModeList[biggerIdx]% 65).

Meanwhile, when the sum of the candidate intra prediction mode A and the candidate intra prediction mode B is greater than or equal to 2, the third MPM candidate, fourth MPM candidate, fifth MPM candidate and sixth MPM candidate of the current block may be derived. The third MPM candidate may be derived as an intra prediction mode derived as a value obtained by performing an operation on an MPM candidate, indicated by an MPM index having a value (i.e., !biggerIdx) by performing an operation on biggerIdx using a negative logic operator, using a negative logic operator. The fourth MPM candidate may be derived as an intra prediction mode derived as 2+((candModeList[biggerIdx]+62) % 65). The fifth MPM candidate may be derived as an intra prediction mode derived as 2+((candModeList[biggerIdx]-1) % 65). The sixth MPM candidate may be derived as an intra prediction mode derived as 2+((candModeList[biggerIdx]+61) % 65).

In another embodiment, an MPM list may be configured using a method different from the algorithm proposed in Table 11. An MPM list may be configured using an algorithm (i.e., spec), such as Table 12 shown in FIG. 20.

Referring to Table 12, a condition for deriving an MPM list is different from that of Table 11, and MPM candidates derived based on each condition are also different from those of Table 11. In this case, a detailed description of contents that overlaps those of Table 11 is omitted.

Referring to Table 12, candidate intra prediction modes A and B may be derived based on the neighboring blocks A and B of a current block. In this case, an MPM list may be differently configured depending on whether a predetermined condition is satisfied based on the candidate intra prediction mode A and the candidate intra prediction mode B.

In one embodiment, whether the candidate intra prediction mode A and the candidate intra prediction mode B are equal may be determined. Whether the candidate intra prediction mode A or the candidate intra prediction mode B has a greater mode number than a DC mode (i.e., No. 1) may be determined. When the candidate intra prediction mode A and the candidate intra prediction mode B are not equal, whether both the candidate intra prediction mode A and the candidate intra prediction mode B have greater mode numbers than the DC mode or any one of them has a greater mode number than the DC mode may be determined. In this case, when both the candidate intra prediction mode A and the candidate intra prediction mode B have a greater mode number than the DC mode, whether both the candidate intra prediction mode A and the candidate intra prediction mode B have a greater mode number than the DC mode may be determined based on whether a mode number difference between the candidate intra prediction mode A and the candidate intra prediction mode B (e.g., whether a difference between the mode numbers of the two candidates is larger than 1 and smaller than 63). MPM candidates derived within an MPM list may be differently determined depending on whether such a condition is satisfied as illustrated in Table 12.

Furthermore, referring to Table 11 and Table 12, remaining MPM candidates are derived using a modular arithmetic in the candidate intra prediction mode A and the candidate intra prediction mode B. The 65 modular arithmetic is used in the embodiment of Table 11, and the 64 modular arithmetic operation is used in the embodiment of Table 12. The modular arithmetic may be differently applied depending on an algorithm by considering prediction performance and complexity. For example, if the modular arithmetic is used, modes having similar directivity may be derived as MPM candidates by considering the directivity of the candidate intra prediction mode A and/or the candidate intra prediction mode B or modes (e.g., non-directional modes) whose consistency is not maintained based on a mode of the candidate intra prediction mode A and/or the candidate intra prediction mode B may be derived as MPM candidates. Accordingly, performance of an intra prediction can be improved and efficiency can be enhanced because MPM candidates having a meaningful angle (i.e., direction) can be derived using the modular arithmetic.

For example, an operation of adding and subtracting an intra prediction mode using the 64 modular arithmetic may be applied like Table 13. For example, if the 64 modular arithmetic is applied to (intra prediction mode+1), (intra prediction mode-1), (intra prediction mode+2), and (intra prediction mode-2) described in Table 2 to Table 8, the results may be calculated like Table 13.

TABLE 13

| Intra mode − 1: (Intra mode + 61) % 64 + 2 |
|---|
| Intra mode + 1: (Intra mode − 1) % 64 + 2 |
| Intra mode − 2: (Intra mode + 60) % 64 + 2 |
| Intra mode + 2: (Intra mode) % 64 + 2 |

As described above, an intra prediction mode for a current block may be derived based on an MPM list including derived MPM candidates. Predicted samples may be generated by performing a prediction on the current block based on the derived intra prediction mode.

In this case, in deriving the intra prediction mode of the current block, when the MPM flag (e.g., intra_luma_mpm_flag in Table 11 and Table 12) is 1, as described above, an MPM candidate indicated by an MPM index (e.g., intra_luma_mpm_idx in Table 11 and Table 12) among the derived MPM candidates may be derived as the intra prediction mode of the current block. Alternatively, when the MPM flag (e.g., intra_luma_mpm_flag in Table 11 and Table 12) is 0, as described above, a remaining mode (e.g., intra_luma_mpm_remainder in Table 11 and Table 12) indicative of one of the remaining intra prediction modes except the derived MPM candidates may be derived as the intra prediction mode of the current block.

As described above, intra prediction mode information for a current block may be coded and signaled as a value of a syntax element. In this case, the intra prediction mode information is information necessary for the intra prediction of the current block, and may include the aforementioned MPM flag, MPM index, remaining mode, etc. In coding the intra prediction mode information, various binarization processes may be applied based on each syntax element.

In this case, the binarization may mean a set of bin strings for all the possible values of the syntax elements. Furthermore, the binarization process may mean a procedure for uniquely mapping all the possible values of the syntax elements to a set of bin strings. The bin may mean one-digit binary value. For example, "0" or "1" may be called a single bin. The bin string may mean a binary order configured with bins, and may be continuous binary values, such as "01."

In one embodiment, syntax elements of intra prediction mode information and corresponding binarization may be the same as Table 14.

TABLE 14

| Syntax structure | Syntax element | Binarization Process | Input parameters |
|---|---|---|---|
| coding_quadtree( ) | qt_split_cu_flag[ ][ ] | FL | cMax = 1 |
| multi_type_tree( ) | mtt_split_cu_flag | FL | cMax = 1 |
|  | mtt_split_cu_vertical_flag | FL | cMax = 1 |
|  | mtt_split_cu_binary_flag | FL | cMax = 1 |
| coding_tree_unit( ) | alf_ctb_flag[ ][ ][ ] | FL | cMax = 1 |
| coding_unit( ) | cu_skip_flag[ ][ ] | FL | cMax = 1 |
|  | pred_mode_flag | FL | cMax = 1 |
|  | intra_luma_mpm_flag[ ][ ] | FL | cMax = 1 |
|  | intra_luma_mpm_idx[ ][ ] | TR | cMax = 5, cRiceParam = 0 |
|  | intra_luma_mpm_remainder[ ][ ] | TB | cMax = 60 |
|  | intra_chroma_pred_mode[ ][ ] | 9.5.3.6 | — |
|  | merge_affine_flag[ ][ ] | FL | cMax = 1 |
|  | merge_flag[ ][ ] | FL | cMax = 1 |
|  | merge_idx[ ][ ] | TR | cMax = MaxNumMergeCand − 1, cRiceParam = 0 |
|  | inter_pred_idx[x0][y0] | 9.5.3.7 | — |
|  | inter_affine_flag[ ][ ] | FL | cMax = 1 |
|  | cu_affine_type_flag[ ][ ] | FL | cMax = 1 |
|  | ref_idx_l0[ ][ ] | TR | cMax = num_ref_idx_l0_active_minus1, cRiceParam = 0 |
|  | mvp_l0_flag[ ][ ] | FL | cMax = 1 |
|  | ref_idx_l1[ ][ ] | TR | cMax = num_ref_idx_l1_active_minus1, cRiceParam = 0 |
|  | mvp_l1_flag[ ][ ] | FL | cMax = 1 |
|  | amvr_mode[ ][ ] | TR | cMax = 2, cRiceParam = 0 |
|  | cu_cbf | FL | cMax = 1 |
| mvd_coding( ) | abs_mvd_greater0_flag[ ] | FL | cMax = 1 |
|  | abs_mvd_greater1_flag[ ] | FL | cMax = 1 |
|  | abs_mvd_minus2[ ] | EG1 | — |
|  | mvd_sign_flag[ ] | FL | cMax = 1 |
| transform_unit( ) | tu_cbf_luma[ ][ ][ ] | FL | cMax = 1 |
|  | tu_cbf_cb[ ][ ][ ] | FL | cMax = 1 |
|  | tu_cbf_cr[ ][ ][ ] | FL | cMax = 1 |
|  | cu_mts_flag[ ][ ] | FL | cMax = 1 |
| residual_coding( ) | transform_skip_flag[ ][ ][ ] | FL | cMax = 1 |
|  | last_sig_coeff_x_prefix | TR | cMax = (log2TrafoSize << 1) − 1, cRiceParam = 0 |
|  | last_sig_coeff_y_prefix | TR | cMax = (log2TrafoSize << 1) − 1, cRiceParam = 0 |
|  | last_sig_coeff_x_suffix | FL | cMax = (1 << ((last_sig_coeff_x_prefix >> 1) − 1) − 1) |
|  | last_sig_coeff_y_suffix | FL | cMax = (1 << ((last_sig_coeff_y_prefix >> 1) − 1) − 1) |
|  | coded_sub_block_flag[ ][ ] | FL | cMax = 1 |
|  | sig_coeff_flag[ ][ ] | FL | cMax = 1 |
|  | par_level_flag[ ] | FL | cMax = 1 |
|  | rem_abs_gt1_flag[ ] | FL | cMax = 1 |
|  | rem_abs_gt2_flag[ ] | FL | cMax = 1 |
|  | abs_remainder[ ] | 9.5.3.8 | cIdx, x0, y0, xC, yC, log2TbWidth, log2TbHeight |
|  | coeff_sign_flag[ ] | FL | cMax = 1 |
|  | mts_idx[ ][ ] | FL | cMax = 3 |

Referring to Table 14, the "intra_luma_mpm_flag" syntax element representing an MPM flag may be encoded/decoded by applying a fixed-length (FL) binarization process to the "intra_luma_mpm_flag" syntax element. The "intra_luma_mpm_idx" syntax element representing an MPM index may be encoded/decoded by applying a truncated rice (TF) binarization process to the "intra_luma_mpm_idx" syntax element. The "intra_luma_mpm_remainder" syntax element representing a remaining mode may be encoded/decoded by applying a truncated binary (TB) binarization process to the "intra_luma_mpm_remainder" syntax element.

According to an embodiment of this document, as described above, the existing 35 intra prediction modes may be extended and thus the 67 intra prediction modes may be used. In this case, in coding intra prediction mode information, a syntax element representing the remaining mode may require 6 bits. However, the number of bits of a syntax element representing the remaining mode may be reduced according to a coding method (i.e., binarization method). That is, as in Table 12, when coding the syntax element representing the remaining mode, the number of bits can be reduced and coding efficiency can be enhanced by performing truncated binary (TB) binarization processing.

In one embodiment, a truncated binary (TB) binarization process, such as Table 15, may be performed on the syntax element representing the remaining mode.

TABLE 15

9.5.3.6 Truncated binary binarization process

Inputs to to this process are a request for a truncated binary (TB) binarization and cMax.
Outputs of this process is the TB binarization associating each value symbolVal with a corresponding bin string.
Syntax elements coded as tb(v) are truncated binary coded. The range of possible values for the syntax element is determined first. The range of this syntax element may be between 0 and cMax, with cMax being greater than or equal to 1. symbolVal which is equal to the value of the syntax element is given by a process specified as follows:

```
    n = cMax + 1
    if (n > 256) {
            thVal = 1 << 8
            th = 8
            while(thVal <= n) {
            th++
            thVal <<= 1
            }
        th--
    }
    else {
            th = Floor (Log2(n)) so that 2^k <= n < 2^(k+1)
    }
    val = 1 << th                                  (9-9)
    b = n - val
    symbolVal = read_bits(th)
    if(symbolVal >= val - b) {
        symbolVal <<= 1
        symbolVal += read_bits(1)
        symbolVal -= val - b
    }
```

Referring to Table 15, when the syntax element (intra_luma_mpm_remainder) representing a remaining mode is input, a TB-binarized value of the syntax element (intra_luma_mpm_remainder) may be output based on truncated binary (TB) coding. First, the range of possible values of the syntax element (intra_luma_mpm_remainder) may be determined. The range of the syntax element (intra_luma_mpm_remainder) may be between 0 to cMax. cMax may indicate a maximum value of the syntax element (intra_luma_mpm_remainder), and may have a value greater than or equal to 1. A TB-binarized value (TB bin string) for the value of the syntax element (intra_luma_mpm_remainder) may be derived based on the algorithm of Table 15. For example, in Table 14, in the case of the syntax element (intra_luma_mpm_remainder) representing a remaining mode, cMax is 60. Accordingly, the syntax element (intra_luma_mpm_remainder) may be represented using 6 bits. However, if binarization coding is performed on a value of the syntax element (intra_luma_mpm_remainder) representing a remaining mode based on TB coding, such as the algorithm of Table 15, the binarization coding may be performed using the number of bits smaller than 6 bits based on the value of the syntax element (intra_luma_mpm_remainder). For example, the syntax element (intra_luma_mpm_remainder) representing a remaining mode may be used to variably generate bits from 1 bit to 5 bits based on a value of the syntax element, and may be coded by TB coding.

Figure 16:
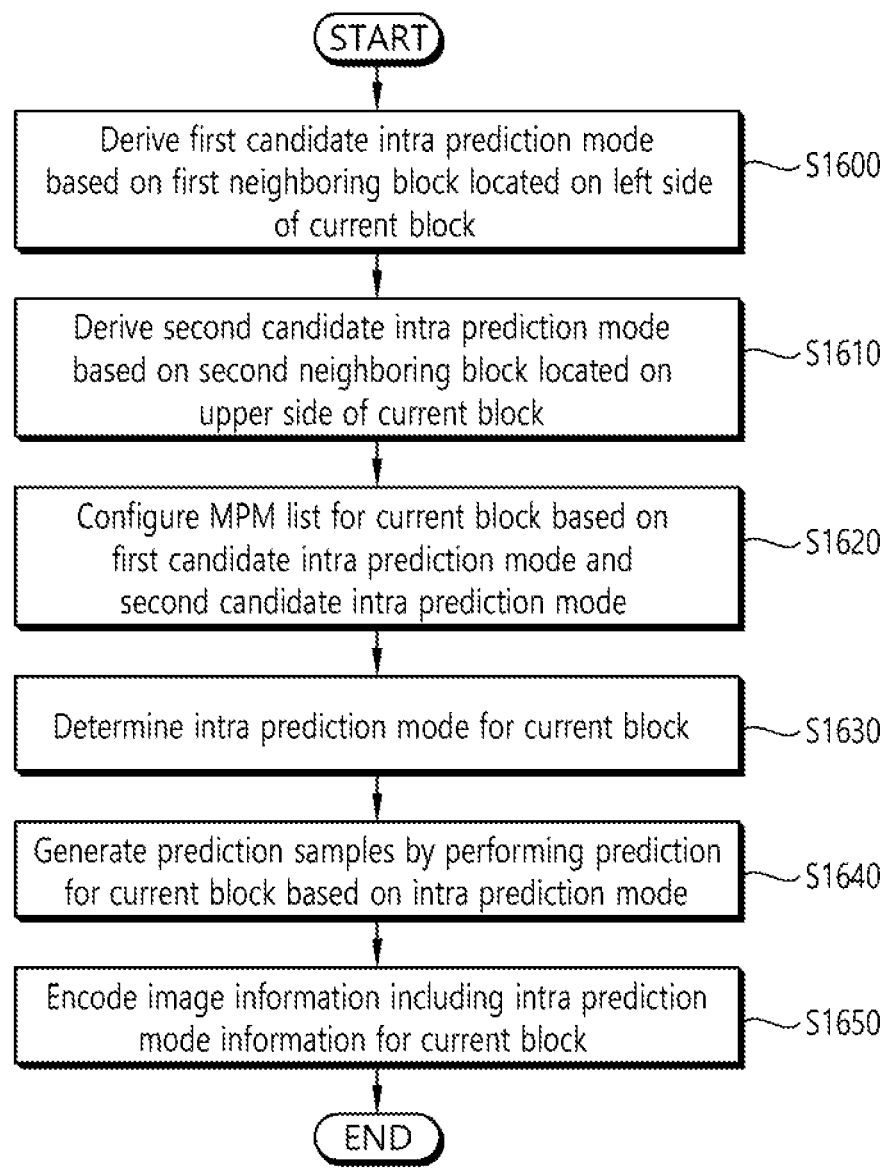
FIG. 16 is a flowchart schematically illustrating an encoding method which may be performed by the encoding apparatus according to an embodiment of this document.

FIG. 16 is a flowchart schematically illustrating an encoding method which may be performed by the encoding apparatus according to an embodiment of this document.

The method disclosed in FIG. 16 may be performed by the encoding apparatus 200 disclosed in FIG. 2. Specifically, steps S1600~S1640 in FIG. 16 may be performed the predictor 220 and the intra predictor 222 disclosed in FIG. 2. Step S1650 in FIG. 16 may be performed by the entropy encoder 240 disclosed in FIG. 2. Furthermore, the method disclosed in FIG. 16 may include the embodiments disclosed in this specification. Accordingly, in FIG. 16, a detailed description of contents that overlap the aforementioned embodiments is omitted or the contents are described in brief.

Referring to FIG. 16, the encoding apparatus may derive a first candidate intra prediction mode based on a first neighboring block located on the left side of a current block (S1600).

In this case, neighboring blocks located adjacent to the current block may include the neighboring block A, the neighboring block B, the neighboring block C, the neighboring block D, the neighboring block E, the neighboring block F and/or the neighboring block G illustrated in FIG. 11. In this case, the first neighboring block is a neighboring block located on the left side of the current block, and may be the neighboring block D illustrated in FIG. 11, for example. That is, the neighboring block D may indicate a left neighboring block located on the downmost side among neighboring blocks neighboring the left boundary of the current block.

In one embodiment, if the first neighboring block is available and an intra prediction has been applied to the first neighboring block, the encoding apparatus may derive an intra prediction mode of the first neighboring block as the first candidate intra prediction mode. Alternatively, if the first neighboring block is not available or an intra prediction is not applied to the first neighboring block, the encoding apparatus may derive a planar mode intra prediction mode as the first candidate intra prediction mode.

The encoding apparatus may derive a second candidate intra prediction mode based on a second neighboring block located on the upper side of the current block (S1610).

In this case, the second neighboring block is a neighboring block located on the upper side of the current block, and may be the neighboring block B illustrated in FIG. 11, for example. That is, the neighboring block B may indicate a upper side neighboring block located on the far right side among neighboring blocks neighboring the upper boundary of the current block. For example, if the size of a current block is W×H and an x component and y component at the top-left sample position of the current block are xN and yN, the first neighboring block may be a block including a sample at (xN−1, H+yN−1) coordinates, and the second neighboring block may be a block including a sample at (W+xN−1, yN−1) coordinates.

In one embodiment, if a second neighboring block is available, an intra prediction is applied to the second neighboring block, and the second neighboring block is included in a current CTU, the encoding apparatus may derive an intra prediction mode of the second neighboring block as the second candidate intra prediction mode. Alternatively, if a second neighboring block is not available or an intra prediction is not applied to the second neighboring block or the second neighboring block is not included in a current CTU, the encoding apparatus may derive a planar mode intra prediction mode as the second candidate intra prediction mode.

The encoding apparatus may configure a most probable mode (MPM) list for the current block based on the first candidate intra prediction mode and the second candidate intra prediction mode (S1620).

That is, the encoding apparatus may derive MPM candidates including at least one of the first candidate intra prediction mode and the second candidate intra prediction mode, and may configure an MPM list based on the MPM candidates. In this case, the aforementioned various embodiments may be applied to a process of deriving the MPM candidates and configuring the MPM list. The process has been described above with reference to FIGS. 12 to 15 and Table 1 to Table 13. According to the aforementioned embodiments, the MPM candidates may be derived to configure the MPM list depending on whether predetermined conditions are satisfied based on the first candidate intra prediction mode derived from the first neighboring block and the second candidate intra prediction mode derived from the second neighboring block.

In this case, at least one of the MPM candidates included in the MPM list may be derived by applying a modular arithmetic operation to the first candidate intra prediction mode or the second candidate intra prediction mode. In this case, in an implementation of the MPM list, an algorithm may be implemented so that the MPM candidates having meaningful angles (i.e., directions) can be configured by considering a total number of intra prediction modes, the direction of an intra prediction, prediction performance, complexity, etc. According to an embodiment, as in Table 9 or Table 13, the MPM candidates may be derived by applying the 64 modular arithmetic operation or the 65 modular arithmetic operation to the first candidate intra prediction mode or the second candidate intra prediction mode.

In one embodiment, an intra prediction mode of one of MPM candidates may be derived based on a result, calculated by calculating a first value by adding 61, 60, 0, or −1 to a greater mode index of a mode index (mode number) of the first candidate intra prediction mode and a mode index (mode number) of the second candidate intra prediction mode, calculating a second value by applying the 64 modular arithmetic operation to the first value, and adding 2 to the second value.

For example, in deriving the MPM candidates, if the first candidate intra prediction mode and the second candidate intra prediction mode are the same intra prediction mode, the encoding apparatus may derive the MPM candidates by determining whether a mode index of the first candidate intra prediction mode has a greater mode index than a DC intra prediction mode. In this case, if the first candidate intra prediction mode has a greater mode index than a DC intra prediction mode, the MPM candidates may include an intra prediction mode derived based on a result calculated by applying the 64 modular arithmetic operation to (the mode index of the first candidate intra prediction mode+61) and adding 2, an intra prediction mode derived based on a result calculated by applying the 64 modular arithmetic operation to (the mode index of the first candidate intra prediction mode−1) and adding 2, and an intra prediction mode derived based on a result obtained by applying the 64 modular arithmetic operation to (the mode index of the first candidate intra prediction mode+60) and adding 2.

Alternatively, for example, in deriving the MPM candidates, if the first candidate intra prediction mode and the second candidate intra prediction mode are not the same intra prediction mode, the encoding apparatus may derive the MPM candidates by determining whether any one of the first candidate intra prediction mode and the second candidate intra prediction mode has a greater mode index than a DC intra prediction mode. In this case, when any one of the first candidate intra prediction mode and the second candidate intra prediction mode has a greater mode index than the DC intra prediction mode, the MPM candidates may include an intra prediction mode derived based on a result obtained by applying the 64 modular arithmetic operation to (a greater mode index of a mode index of the first candidate intra prediction mode and a mode index of the second candidate intra prediction mode+61) and adding 2, an intra prediction mode derived based on a result obtained by applying the 64 modular arithmetic operation to (a greater mode index of a mode index of the first candidate intra prediction mode and a mode index of the second candidate intra prediction mode−1) and adding 2, and an intra prediction mode derived based on a result obtained by applying the 64 modular arithmetic operation to (a greater mode index of a mode index of the first candidate intra prediction mode and a mode index of the second candidate intra prediction mode+60) and adding 2.

Alternatively, for example, in deriving the MPM candidates, if the first candidate intra prediction mode and the second candidate intra prediction mode are not the same intra prediction mode, the encoding apparatus may derive the MPM candidates by determining whether each of the first candidate intra prediction mode and the second candidate intra prediction mode has a greater mode index than a DC intra prediction mode. In this case, when each of the first candidate intra prediction mode and the second candidate intra prediction mode has a greater mode index than the DC intra prediction mode, the MPM candidates may include an intra prediction mode derived based on a result obtained by applying the 64 modular arithmetic operation to (a greater mode index of the mode index of the first candidate intra prediction mode and the mode index of the second candidate intra prediction mode+61) and adding 2 or an intra prediction mode derived based on a result obtained by applying the 64 modular arithmetic operation to (a greater mode index of the mode index of the first candidate intra prediction mode and the mode index of the second candidate intra prediction mode−1) and adding 2, based on a difference between the mode index of the first candidate intra prediction mode and the mode index of the second candidate intra prediction mode.

For example, if each of the first candidate intra prediction mode and the second candidate intra prediction mode has a greater mode index than a DC intra prediction mode and a difference between the first mode index and the second mode index is 62, the MPM candidates may include an intra prediction mode derived based on a result obtained by applying the 64 modular arithmetic operation to (the first mode index+61) and adding 2.

For another example, if each of the first candidate intra prediction mode and the second candidate intra prediction mode has a greater mode index than a DC intra prediction mode and a difference between the first mode index and the second mode index is 2, the MPM candidates may include an intra prediction mode derived based on a result obtained by applying the 64 modular arithmetic operation to (the first mode index−1) and adding 2.

In this case, the first mode index may indicate a larger mode index among the first candidate intra prediction mode and the second candidate intra prediction mode. The second mode index may indicate a smaller mode index among the first candidate intra prediction mode and the second candidate intra prediction mode.

The encoding apparatus may include the MPM candidates, derived as described above, in the MPM list. In this case, each of the MPM candidates may be sequentially indexed within the list, and may be indicated as an index value of the MPM list. That is, the encoding apparatus may indicate any one of the MPM candidates within the MPM list by signaling the index value.

The encoding apparatus may determine an intra prediction mode of the current block (S1630).

In one embodiment, the encoding apparatus may derive an intra prediction mode having an optimal rate-distortion (RD) cost by performing various intra prediction modes on the current block, and may determine the intra prediction mode as an intra prediction mode of the current block. In this case, the encoding apparatus may derive the best intra prediction mode of the current block based on intra prediction modes, including 2 non-directional intra prediction modes and 65 intra directional prediction modes. The 67 intra prediction modes are the same as those described above with reference to FIG. 10.

Furthermore, the encoding apparatus may generate information related to the intra prediction mode of the current block. The information related to the intra prediction mode is information for indicating the intra prediction mode of the current block, and may include MPM flag information, MPM index information, remaining mode information, etc.

In one embodiment, the encoding apparatus may determine whether the determined intra prediction mode of the current block is included in the MPM candidates within the MPM list, and may generate MPM flag information based on a result of the determination. For example, if the intra prediction mode of the current block is included in the MPM candidates within the MPM list, the encoding apparatus may set the MPM flag information to 1. Alternatively, if the intra prediction mode of the current block is not included in the MPM candidates within the MPM list, the encoding apparatus may set the MPM flag information to 0.

Furthermore, if the intra prediction mode of the current block is included in the MPM candidates within the MPM list, the encoding apparatus may generate MPM index information for indicating the intra prediction mode of the current block among the MPM candidates. For example, if the MPM list is configured with k (e.g., 6) MPM candidates, MPM index information may indicate an index value corresponding to the intra prediction mode of the current block, among 0~k−1 (e.g., 0~5) index values.

If the intra prediction mode of the current block is not included in the MPM candidates within the MPM list, the encoding apparatus may generate remaining mode information for indicating the intra prediction mode of the current block among remaining intra prediction modes except the MPM candidates. For example, as described above, if the 67 intra prediction modes are used and the MPM list is configured to include k (e.g., 6) MPM candidates, remaining intra prediction modes may include 67−k (e.g., 61) modes obtained by subtracting the number of MPM candidates from a total number of intra prediction modes. Accordingly, remaining mode information may indicate an index value corresponding to the intra prediction mode of the current block among 0~67−k−1 (e.g., 0~60) index values.

The encoding apparatus may generate prediction samples for the current block by performing an intra prediction based on the determined intra prediction mode of the current block (S1640).

In one embodiment, the encoding apparatus may derive at least one of neighboring samples of a current block based on an intra prediction mode, and may generate prediction samples based on the neighboring sample. In this case, the neighboring samples may include the top left corner neighboring sample, upper side neighboring samples and left side neighboring samples of the current block. For example, if the size of a current block is W×H and an x component and y component at the top-left sample position of the current block are xN and yN, left side neighboring samples may be p[xN−1][yN] to p[xN−1][2H+yN−1], a top left corner neighboring sample may be p[xN−1][yN−1], and upper side neighboring samples may be p[xN][yN−1] to p[2 W+xN−1][yN−1].

The encoding apparatus may encode image information including the information related to the intra prediction mode of the current block (S1650).

That is, the encoding apparatus may generate information related to the intra prediction mode, including at least one of the aforementioned MPM flag information, MPM index information, and remaining mode information, and may encode the information related to the intra prediction mode.

Furthermore, although not illustrated, the encoding apparatus may derive residual samples for the current block based on the original samples and prediction samples for the current block, and may generate information related to a residual for the current block based on residual samples. Furthermore, the encoding apparatus may encode image information including the information related to the residual, and may output the image information in a bitstream form.

The bitstream may be transmitted to the decoding apparatus over a network or through a (digital) storage medium. In this case, the network may include a broadcasting network and/or a communication network. The digital storage medium may include various storage media, such as a USB, an SD, a CD, a DVD, Blueray, an HDD, and an SSD.

The process of deriving a residual sample for a current block may be performed by the subtractor 231 of the encoding apparatus 200 disclosed in FIG. 2. The process of generating information related to a residual may be performed by the transformer 232 of the encoding apparatus 200 disclosed in FIG. 2. The process of encoding image information including information related to a residual may be performed by the entropy encoder 240 of the encoding apparatus 200 disclosed in FIG. 2.

Figure 17:
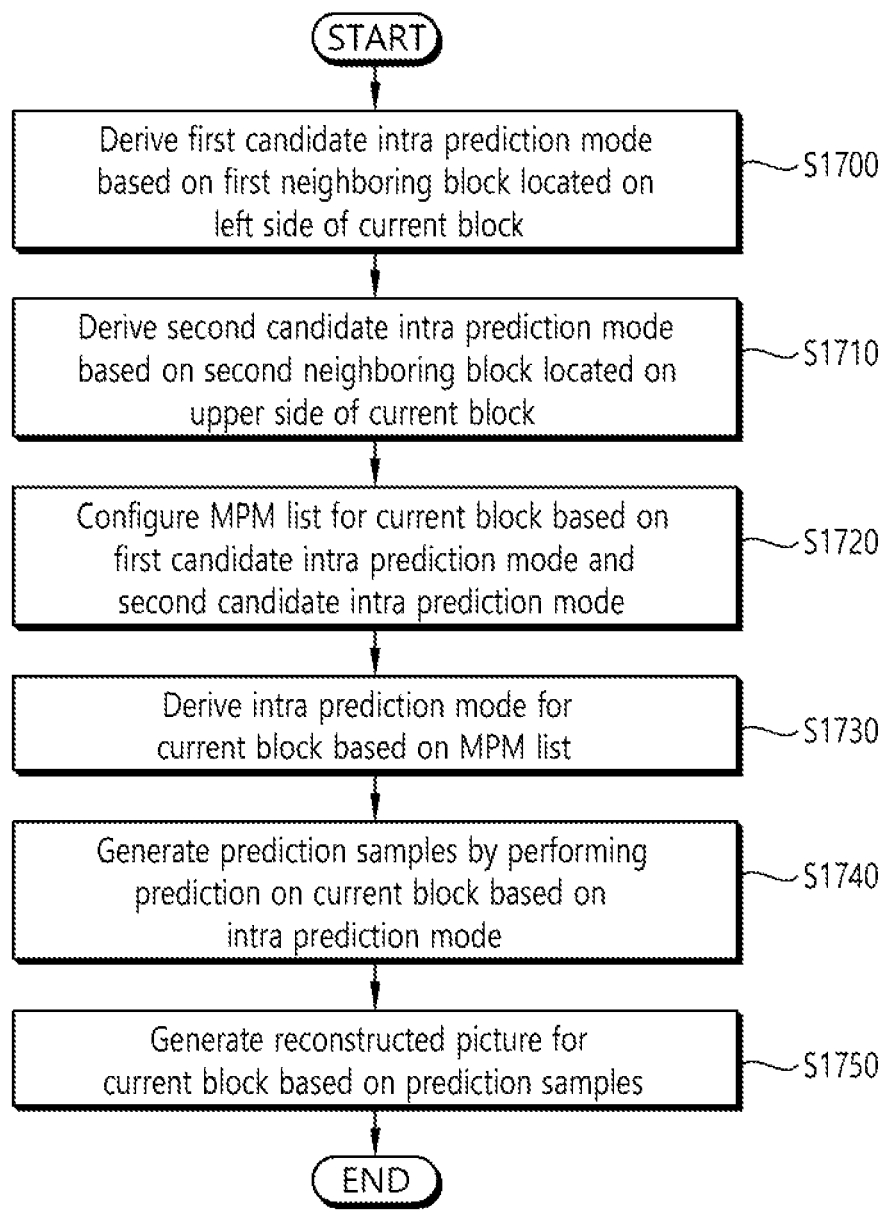
FIG. 17 is a flowchart schematically illustrating a decoding method which may be performed by the decoding apparatus according to an embodiment of this document.

FIG. 17 is a flowchart schematically illustrating a decoding method which may be performed by the decoding apparatus according to an embodiment of this document.

The method disclosed in FIG. 17 may be performed by the decoding apparatus 300 disclosed in FIG. 3. Specifically, steps S1700~S1740 in FIG. 17 may be performed by the predictor 330 and the intra predictor 331 disclosed in FIG.

3. Step S1750 in FIG. 17 may be performed by the adder 340 disclosed in FIG. 3. Furthermore, in FIG. 17, step S1730 may be performed by the entropy decoder 310 disclosed in FIG. 3. Furthermore, the method disclosed in FIG. 17 may include the embodiments described in this specification. Accordingly, in FIG. 17, a detailed description of contents that overlap the aforementioned embodiments is omitted or the contents are described in brief.

Referring to FIG. 17, the decoding apparatus may derive a first candidate intra prediction mode based on a first neighboring block located on the left side of a current block (S1700).

In this case, neighboring blocks located adjacent to the current block may include the neighboring block A, the neighboring block B, the neighboring block C, the neighboring block D, the neighboring block E, the neighboring block F and/or the neighboring block G illustrated in FIG. 11. In this case, the first neighboring block is a neighboring block located on the left side of the current block, and may be the neighboring block D illustrated in FIG. 11, for example. That is, the neighboring block D may indicate a left neighboring block located on the downmost side among left neighboring blocks neighboring the left boundary of the current block.

In one embodiment, if the first neighboring block is available and an intra prediction has been applied to the first neighboring block, the decoding apparatus may derive an intra prediction mode of the first neighboring block as the first candidate intra prediction mode. Alternatively, if the first neighboring block is not available or an intra prediction is not applied to the first neighboring block, the decoding apparatus may derive a planar mode intra prediction mode as the first candidate intra prediction mode.

The decoding apparatus may derive a second candidate intra prediction mode based on a second neighboring block located on the upper side of the current block (S1710).

In this case, the second neighboring block is a neighboring block located on the upper side of the current block, and may be the neighboring block B illustrated in FIG. 11, for example. That is, the neighboring block B may indicate a upper side neighboring block located on the far right side among neighboring blocks neighboring the upper boundary of the current block. For example, if the size of a current block is W×H and an x component and y component at the top-left sample position of the current block are xN and yN, the first neighboring block may be a block including a sample at (xN−1, H+yN−1) coordinates and the second neighboring block may be a block including a sample at (W+xN−1, yN−1) coordinates.

In one embodiment, if the second neighboring block is available, an intra prediction is applied to the second neighboring block, and the second neighboring block is included in a current CTU, the decoding apparatus may derive an intra prediction mode of the second neighboring block as the second candidate intra prediction mode. Alternatively, if the second neighboring block is not available or an intra prediction is not applied to the second neighboring block or the second neighboring block is not included in a current CTU, the decoding apparatus may derive a planar mode intra prediction mode as the second candidate intra prediction mode.

The decoding apparatus may configure a most probable mode (MPM) list for the current block based on the first candidate intra prediction mode and the second candidate intra prediction mode (S1720).

That is, the decoding apparatus may derive MPM candidates including at least one of the first candidate intra prediction mode and the second candidate intra prediction mode, and may configure the MPM list based on the MPM candidates. In this case, the aforementioned various embodiments may be applied to the process of configuring the MPM list by deriving the MPM candidates. This has been described above with reference to FIGS. 12 to 15 and Table 1 to Table 13. According to the aforementioned embodiments, the MPM list may be configured by deriving the MPM candidates depending on whether predetermined conditions are satisfied based on the first candidate intra prediction mode derived from the first neighboring block and the second candidate intra prediction mode derived from the second neighboring block.

In this case, at least one of the MPM candidates included in the MPM list may be derived by applying a modular arithmetic operation to the first candidate intra prediction mode or the second candidate intra prediction mode. In this case, in the implementation of the MPM list, an algorithm may be implemented so that the MPM candidates having meaningful angles (i.e., directions) are configured by considering a total number of intra prediction modes, the direction of an intra prediction, prediction performance, complexity, etc. In some embodiments, as in Table 9 or Table 13, the MPM candidates may be derived by applying the 64 modular arithmetic operation or the 65 modular arithmetic operation to the first candidate intra prediction mode or the second candidate intra prediction mode.

In one embodiment, an intra prediction mode of one of the MPM candidates may be derived based on a result, calculated by calculating a first value by adding 61, 60, 0, or −1 to a greater mode index of a mode index (mode number) of the first candidate intra prediction mode and a mode index (mode number) of the second candidate intra prediction mode, calculating a second value by applying the 64 modular arithmetic operation to the first value, and adding 2 to the second value.

For example, in deriving the MPM candidates, if the first candidate intra prediction mode and the second candidate intra prediction mode are the same intra prediction mode, the decoding apparatus may derive the MPM candidates by determining whether a mode index of the first candidate intra prediction mode has a greater mode index than a DC intra prediction mode. In this case, if the first candidate intra prediction mode has a greater mode index than a DC intra prediction mode, the MPM candidates may include an intra prediction mode derived based on a result calculated by applying the 64 modular arithmetic operation to (the mode index of the first candidate intra prediction mode+61) and adding 2, an intra prediction mode derived based on a result calculated by applying the 64 modular arithmetic operation to (the mode index of the first candidate intra prediction mode−1) and adding 2, and an intra prediction mode derived based on a result obtained by applying the 64 modular arithmetic operation to (the mode index of the first candidate intra prediction mode+60) and adding 2.

Alternatively, for example, in deriving the MPM candidates, if the first candidate intra prediction mode and the second candidate intra prediction mode are not the same intra prediction mode, the decoding apparatus may derive the MPM candidates by determining whether any one of the first candidate intra prediction mode and the second candidate intra prediction mode has a greater mode index than a DC intra prediction mode. In this case, when any one of the first candidate intra prediction mode and the second candidate intra prediction mode has a greater mode index than the DC intra prediction mode, the MPM candidates may include an intra prediction mode derived based on a result obtained by applying the 64 modular arithmetic operation to (a greater mode index of a mode index of the first candidate intra prediction mode and a mode index of the second candidate intra prediction mode+61) and adding 2, an intra prediction mode derived based on a result obtained by applying the 64 modular arithmetic operation to (a greater mode index of a mode index of the first candidate intra prediction mode and a mode index of the second candidate intra prediction mode−1) and adding 2, and an intra prediction mode derived based on a result obtained by applying the 64 modular arithmetic operation to (a greater mode index of a mode index of the first candidate intra prediction mode and a mode index of the second candidate intra prediction mode+60) and adding 2.

Alternatively, for example, in deriving the MPM candidates, if the first candidate intra prediction mode and the second candidate intra prediction mode are not the same intra prediction mode, the decoding apparatus may derive the MPM candidates by determining whether each of the first candidate intra prediction mode and the second candidate intra prediction mode has a greater mode index than a DC intra prediction mode. In this case, when each of the first candidate intra prediction mode and the second candidate intra prediction mode has a greater mode index than the DC intra prediction mode, the MPM candidates may include an intra prediction mode derived based on a result obtained by applying the 64 modular arithmetic operation to (a greater mode index of the mode index of the first candidate intra prediction mode and the mode index of the second candidate intra prediction mode+61) and adding 2 or an intra prediction mode derived based on a result obtained by applying the 64 modular arithmetic operation to (a greater mode index of the mode index of the first candidate intra prediction mode and the mode index of the second candidate intra prediction mode−1) and adding 2, based on a difference between the mode index of the first candidate intra prediction mode and the mode index of the second candidate intra prediction mode.

For example, if each of the first candidate intra prediction mode and the second candidate intra prediction mode has a greater mode index than a DC intra prediction mode and a difference between the first mode index and the second mode index is 62, the MPM candidates may include an intra prediction mode derived based on a result obtained by applying the 64 modular arithmetic operation to (the first mode index+61) and adding 2.

For another example, if each of the first candidate intra prediction mode and the second candidate intra prediction mode has a greater mode index than a DC intra prediction mode and a difference between the first mode index and the second mode index is 2, the MPM candidates may include an intra prediction mode derived based on a result obtained by applying the 64 modular arithmetic operation to (the first mode index−1) and adding 2.

In this case, the first mode index may indicate a larger mode index among the first candidate intra prediction mode and the second candidate intra prediction mode. The second mode index may indicate a smaller mode index among the first candidate intra prediction mode and the second candidate intra prediction mode.

The decoding apparatus may include the MPM candidates, derived as described above, in the MPM list. In this case, each of the MPM candidates may be sequentially indexed within the list, and may be indicated as an index value of the MPM list. That is, the decoding apparatus may determine which one of the MPM candidates within the MPM list is indicated based on an index value signaled by the encoding apparatus.

The decoding apparatus may derive an intra prediction mode of the current block based on the MPM list (S1730).

In one embodiment, the decoding apparatus may obtain information related to the intra prediction mode of the current block from a bitstream. The information related to the intra prediction mode is information for indicating the intra prediction mode of the current block, and may include MPM flag information, MPM index information, remaining mode information, etc.

First, the decoding apparatus may obtain MPM flag information indicating whether the intra prediction mode of the current block is included in the MPM candidates within the MPM list. Furthermore, the decoding apparatus may obtain MPM index information or remaining mode information based on the MPM flag information.

For example, when the MPM flag information indicates 1, the decoding apparatus may determine that the intra prediction mode of the current block is included in the MPM candidates within the MPM list. In this case, the decoding apparatus may obtain MPM index information for indicating the intra prediction mode of the current block among the MPM candidates. The decoding apparatus may derive, as the intra prediction mode of the current block, an MPM candidate indicated by the MPM index information within the MPM list.

When the MPM flag information indicates 0, the decoding apparatus may determine that the intra prediction mode of the current block is not included in the MPM candidates within the MPM list. In this case, the decoding apparatus may obtain remaining mode information for indicating the intra prediction mode of the current block among remaining intra prediction modes except the MPM candidates. The decoding apparatus may derive, as the intra prediction mode of the current block, an intra prediction mode indicated by the remaining mode information.

The decoding apparatus may generate prediction samples for the current block by performing an intra prediction on the current block based on the derived intra prediction mode (S1740).

In one embodiment, the decoding apparatus may derive at least one of neighboring samples of a current block based on an intra prediction mode, and may generate prediction samples based on the neighboring sample. In this case, the neighboring samples may include the top left corner neighboring sample, upper side neighboring samples and left side neighboring samples of the current block. For example, if the size of a current block is W×H and an x component and y component at the top-left sample position of the current block are xN and yN, left side neighboring samples may be p[xN−1][yN] to p[xN−1][2H+yN−1], a top left corner neighboring sample may be p[xN−1][yN−1], and upper side neighboring samples may be p[xN][yN−1] to p[2 W+xN−1][yN−1].

The decoding apparatus may generate a reconstructed picture for the current block based on the prediction samples (S1750).

In one embodiment, the decoding apparatus may use the prediction samples directly as reconstructed samples based on a prediction mode or may generate reconstructed samples by adding residual samples to the prediction samples.

If a residual sample for the current block is present, the decoding apparatus may receive information related to a residual for the current block. The information related to the residual may include a transform coefficient related to residual samples. The decoding apparatus may derive residual samples (or residual sample array) for the current block based on the residual information. The decoding apparatus may generate reconstructed samples based on the prediction samples and the residual samples, and may derive a reconstructed block or reconstructed picture based on the reconstructed samples. Thereafter, the decoding apparatus may apply an in-loop filtering procedure, such as deblocking filtering and/or an SAO procedure, to the reconstructed picture in order to enhance subjective/object picture quality, as described above.

In the aforementioned embodiments, although the methods have been described based on the flowcharts in the form of a series of steps or units, the embodiments of this document are not limited to the order of the steps, and some of the steps may be performed in a different order from that of other steps or may be performed simultaneous to other steps. Furthermore, those skilled in the art will understand that the steps shown in the flowchart are not exclusive and the steps may include additional steps or that one or more steps in the flowchart may be deleted without affecting the scope of rights of this document.

The aforementioned method according to this document may be implemented in a software form, and the encoding apparatus and/or the decoding apparatus according to this document may be included in an apparatus for performing image processing, for example, TV, a computer, a smartphone, a set-top box or a display device.

In this document, when embodiments are implemented in a software form, the aforementioned method be implemented as a module (process, function, etc.) for performing the aforementioned function. The module may be stored in the memory and executed by the processor. The memory may be placed inside or outside the processor and connected to the processor by various well-known means. The processor may include application-specific integrated circuits (ASICs), other chipsets, logic circuits and/or data processing devices. The memory may include read-only memory (ROM), random access memory (RAM), flash memory, memory cards, storage media and/or other storage devices. That is, the embodiments described in this document may be implemented and performed on a processor, a micro processor, a controller or a chip. For example, the function units illustrated in the drawings may be implemented and performed on a computer, a processor, a micro processor, a controller or a chip. In this case, information (e.g., information on instructions) or an algorithm for such implementation may be stored in a digital storage medium.

Furthermore, the decoding apparatus and the encoding apparatus to which this document is applied may be included in a multimedia broadcasting transmission and reception device, a mobile communication terminal, a home cinema video device, a digital cinema video device, a camera for monitoring, a video dialogue device, a real-time communication device such as video communication, a mobile streaming device, a storage medium, a camcorder, a video on-demand (VoD) service provision device, an over the top (OTT) video device, an Internet streaming service provision device, a three-dimensional (3D) video device, a virtual reality (VR) device, an augmented reality (AR) device, a video telephony device, transportation means terminal (e.g., a vehicle (including autonomous vehicle) terminal, an aircraft terminal, and a vessel terminal), and a medical video device, and may be used to process a video signal or a data signal. For example, the over the top (OTT) video device may include a game console, a Blueray player, Internet access TV, a home theater system, a smartphone, a tablet PC, and a digital video recorder (DVR).

Furthermore, the processing method to which this document is applied may be produced in the form of a program executed by a computer, and may be stored in a computer-readable recording medium. Multimedia data having a data structure according to this document may also be stored in a computer-readable recording medium. The computer-readable recording medium includes all types of storage devices in which computer-readable data is stored. The computer-readable recording medium may include Blueray disk (BD), a universal serial bus (USB), a ROM, a PROM, an EPROM, an EEPROM, a RAM, a CD-ROM, a magnetic tape, a floppy disk, and an optical data storage device, for example. Furthermore, the computer-readable recording medium includes media implemented in the form of carriers (e.g., transmission through the Internet). Furthermore, a bit stream generated using an encoding method may be stored in a computer-readable recording medium or may be transmitted over wired and wireless communication networks.

Furthermore, an embodiment of this document may be implemented as a computer program product using program code. The program code may be performed by a computer according to an embodiment of this document. The program code may be stored on a carrier readable by a computer.

Figure 18:
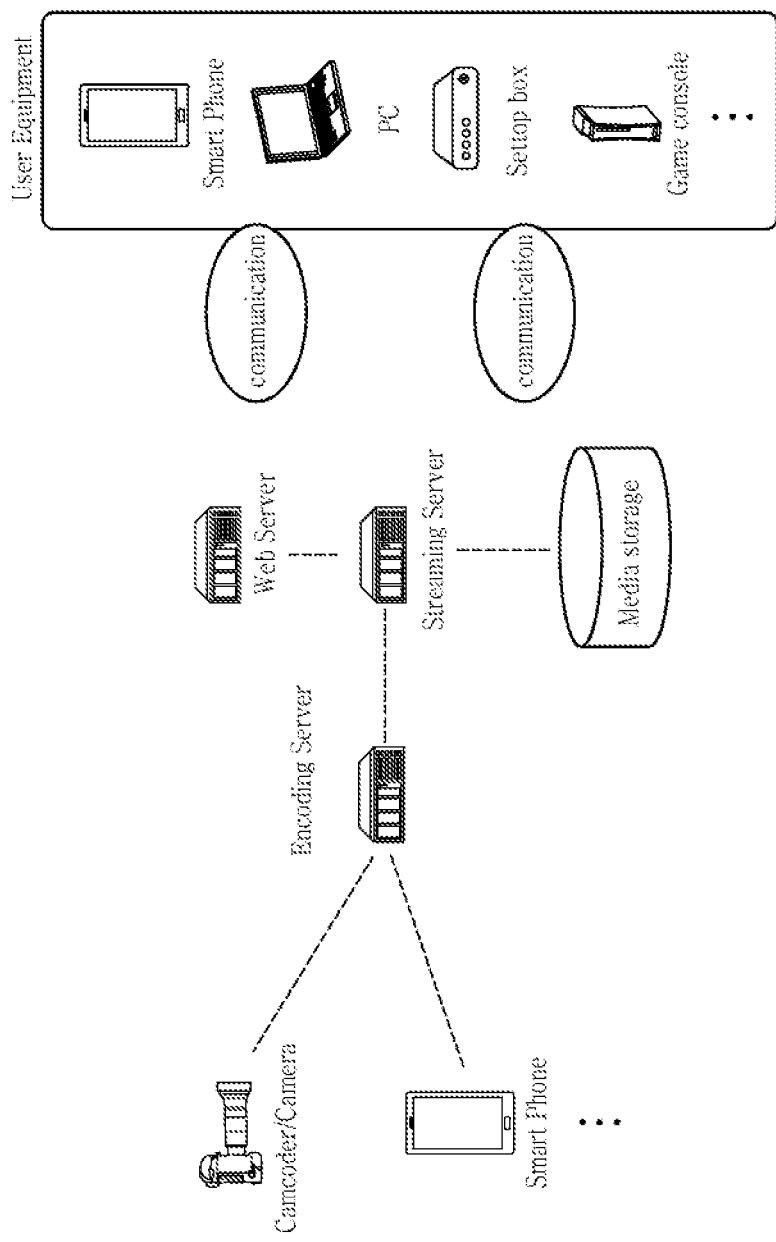
FIG. 18 illustrates an example of a content streaming system to which embodiments disclosed in this document may be applied.

FIG. 18 illustrates an example of a content streaming system to which embodiments disclosed in this document may be applied.

Referring to FIG. 18, the content streaming system to which the embodiment(s) of the present document is applied may largely include an encoding server, a streaming server, a web server, a media storage, a user device, and a multimedia input device.

The encoding server compresses content input from multimedia input devices such as a smartphone, a camera, a camcorder, etc. into digital data to generate a bitstream and transmit the bitstream to the streaming server. As another example, when the multimedia input devices such as smartphones, cameras, camcorders, etc. directly generate a bitstream, the encoding server may be omitted.

The bitstream may be generated by an encoding method or a bitstream generating method to which the embodiment(s) of the present document is applied, and the streaming server may temporarily store the bitstream in the process of transmitting or receiving the bitstream.

The streaming server transmits the multimedia data to the user device based on a user's request through the web server, and the web server serves as a medium for informing the user of a service. When the user requests a desired service from the web server, the web server delivers it to a streaming server, and the streaming server transmits multimedia data to the user. In this case, the content streaming system may include a separate control server. In this case, the control server serves to control a command/response between devices in the content streaming system.

The streaming server may receive content from a media storage and/or an encoding server. For example, when the content is received from the encoding server, the content may be received in real time. In this case, in order to provide a smooth streaming service, the streaming server may store the bitstream for a predetermined time.

Examples of the user device may include a mobile phone, a smartphone, a laptop computer, a digital broadcasting terminal, a personal digital assistant (PDA), a portable multimedia player (PMP), navigation, a slate PC, tablet PCs, ultrabooks, wearable devices (ex. smartwatches, smart glasses, head mounted displays), digital TVs, desktops computer, digital signage, and the like.

Each server in the content streaming system may be operated as a distributed server, in which case data received from each server may be distributed.

What is claimed is:

1. A video decoding method performed by a decoding apparatus, the method comprising:
    deriving a first candidate intra prediction mode based on a first neighboring block which is located on a downmost side among neighboring blocks neighboring a left boundary of a current block;
    deriving a second candidate intra prediction mode based on a second neighboring block which is located on a far right side among neighboring blocks neighboring an upper boundary of the current block;
    constructing candidate mode list for the current block based on the first candidate intra prediction mode and the second candidate intra prediction mode;
    deriving an intra prediction mode for the current block based on the candidate mode list;
    generating predicted samples by performing prediction for the current block based on the intra prediction mode; and
    generating a reconstructed picture for the current block based on the predicted samples,
    wherein the step of constructing the candidate mode list includes deriving candidate modes including one among the first candidate intra prediction mode or the second candidate intra prediction mode,
    wherein the step of constructing the candidate mode list includes deriving the candidate modes by determining whether one of the first candidate intra prediction mode and the second candidate intra prediction mode is greater than a mode index of DC intra prediction mode, based on the first candidate intra prediction mode and the second candidate intra prediction mode being not the same intra prediction mode, and
    wherein based on one of the first candidate intra prediction mode and the second candidate intra prediction mode being greater than the mode index of the DC intra prediction mode, the candidate modes comprise:
    an intra prediction mode derived by obtaining a first value of adding 61 to a greater mode index among a mode index of the first candidate intra prediction mode and a mode index of the second candidate intra prediction mode and obtaining a second value of applying the 64 modular arithmetic operation to the first value and obtaining a result value of adding 2 to the second value,
    an intra prediction mode derived by obtaining a third value of subtracting 1 from a greater mode index among a mode index of the first candidate intra prediction mode and a mode index of the second candidate intra prediction mode and obtaining a fourth value of applying the 64 modular arithmetic operation to the third value and obtaining a result value of adding 2 to the fourth value, and
    an intra prediction mode derived by obtaining a fifth value of adding 60 to a greater mode index among a mode index of the first candidate intra prediction mode and a mode index of the second candidate intra prediction mode and obtaining a sixth value of applying the 64 modular arithmetic operation to the fifth value and obtaining a result value of adding 2 to the sixth value.

2. The video decoding method of claim 1, wherein the step of deriving the first candidate intra prediction mode comprises:
    deriving an intra prediction mode of the first neighboring block as the first candidate intra prediction mode when the first neighboring block is available and an intra prediction is applied to the first neighboring block, and
    deriving a planar intra prediction mode as the first candidate intra prediction mode when the first neighboring block is not available or the intra prediction is not applied to the first neighboring block.

3. The video decoding method of claim 1, wherein the step of deriving the second candidate intra prediction mode comprises:
    deriving an intra prediction mode of the second neighboring block as the second candidate intra prediction mode when the second neighboring block is available, an intra prediction is applied to the second neighboring block, and the second neighboring block is included in a current CTU, and
    deriving a planar intra prediction mode as the second candidate intra prediction mode when the second neighboring block is not available or the intra prediction is not applied to the second neighboring block or the second neighboring block is not included in the current CTU.

4. A video encoding method performed by an encoding apparatus, the method comprising:
    deriving a first candidate intra prediction mode based on a first neighboring block which is located on a downmost side neighboring blocks neighboring a left boundary of a current block;
    deriving a second candidate intra prediction mode based on a second neighboring block which is located in on a far side among neighboring blocks neighboring an upper boundary of the current block;
    constructing candidate mode list for the current block based on the first candidate intra prediction mode and the second candidate intra prediction mode;
    determining an intra prediction mode for the current block;
    generating prediction samples by performing a prediction for the current block based on the intra prediction mode; and
    encoding image information including intra prediction mode information for the current block,
    wherein the step of constructing the candidate mode list includes deriving candidate modes including one among the first candidate intra prediction mode or the second candidate intra prediction mode,
    wherein the step of constructing the candidate mode list includes deriving the candidate modes by determining whether one of the first candidate intra prediction mode and the second candidate intra prediction mode is greater than a mode index of DC intra prediction mode, based on the first candidate intra prediction mode and the second candidate intra prediction mode being not the same intra prediction mode, and
    wherein based on one of the first candidate intra prediction mode and the second candidate intra prediction mode being greater than the mode index of the DC intra prediction mode, the candidate modes comprise:
    an intra prediction mode derived by obtaining a first value of adding 61 to a greater mode index among a mode index of the first candidate intra prediction mode and a mode index of the second candidate intra prediction mode and obtaining a second value of applying the 64 modular arithmetic operation to the first value and obtaining a result value of adding 2 to the second value, an intra prediction mode derived by obtaining a third value of subtracting 1 from a greater mode index among a mode index of the first candidate intra prediction mode and a mode index of the second candidate intra prediction mode and obtaining a fourth value of applying the 64 modular arithmetic operation to the third value and obtaining a result value of adding 2 to the fourth value, and an intra prediction mode derived by obtaining a fifth value of adding 60 to a greater mode index among a mode index of the first candidate intra prediction mode and a mode index of the second candidate intra prediction mode and obtaining a sixth value of applying the 64 modular arithmetic operation to the fifth value and obtaining a result value of adding 2 to the sixth value.

5. A non-transitory computer-readable storage medium storing a bitstream generated by steps of:

deriving a first candidate intra prediction mode based on a first neighboring block which is located on a downmost side neighboring blocks neighboring a left boundary of a current block;

deriving a second candidate intra prediction mode based on a second neighboring block which is located in on a far side among neighboring blocks neighboring an upper boundary of the current block;

constructing candidate mode list for the current block based on the first candidate intra prediction mode and the second candidate intra prediction mode;

determining an intra prediction mode for the current block;

generating prediction samples by performing a prediction for the current block based on the intra prediction mode; and encoding image information including intra prediction mode information for the current block to output the bitstream, wherein the step of constructing the candidate mode list includes deriving candidate modes including one among the first candidate intra prediction mode or the second candidate intra prediction mode, wherein the step of constructing the candidate mode list includes deriving the candidate modes by determining whether one of the first candidate intra prediction mode and the second candidate intra prediction mode is greater than a mode index of DC intra prediction mode, based on the first candidate intra prediction mode and the second candidate intra prediction mode being not the same intra prediction mode, and wherein based on one of the first candidate intra prediction mode and the second candidate intra prediction mode being greater than the mode index of the DC intra prediction mode, the candidate modes comprise:

an intra prediction mode derived by obtaining a first value of adding 61 to a greater mode index among a mode index of the first candidate intra prediction mode and a mode index of the second candidate intra prediction mode and obtaining a second value of applying the 64 modular arithmetic operation to the first value and obtaining a result value of adding 2 to the second value, an intra prediction mode derived by obtaining a third value of subtracting 1 from a greater mode index among a mode index of the first candidate intra prediction mode and a mode index of the second candidate intra prediction mode and obtaining a fourth value of applying the 64 modular arithmetic operation to the third value and obtaining a result value of adding 2 to the fourth value, and an intra prediction mode derived by obtaining a fifth value of adding 60 to a greater mode index among a mode index of the first candidate intra prediction mode and a mode index of the second candidate intra prediction mode and obtaining a sixth value of applying the 64 modular arithmetic operation to the fifth value and obtaining a result value of adding 2 to the sixth value.

6. A method of transmitting data for an image by an apparatus, the method comprising:

obtaining a bitstream for image information, wherein the bitstream is generated by deriving a first candidate intra prediction mode based on a first neighboring block which is located on a downmost side neighboring blocks neighboring a left boundary of a current block, deriving a second candidate intra prediction mode based on a second neighboring block which is located in on a far side among neighboring blocks neighboring an upper boundary of the current block, constructing candidate mode list for the current block based on the first candidate intra prediction mode and the second candidate intra prediction mode, determining an intra prediction mode for the current block, generating prediction samples by performing a prediction for the current block based on the intra prediction mode, and encoding image information including intra prediction mode information for the current block to generate the bitstream; and transmitting the data comprising the bitstream, wherein the constructing the candidate mode list includes deriving candidate modes including one among the first candidate intra prediction mode or the second candidate intra prediction mode, wherein the constructing the candidate mode list includes deriving the candidate modes by determining whether one of the first candidate intra prediction mode and the second candidate intra prediction mode is greater than a mode index of DC intra prediction mode, based on the first candidate intra prediction mode and the second candidate intra prediction mode being not the same intra prediction mode, and wherein based on one of the first candidate intra prediction mode and the second candidate intra prediction mode being greater than the mode index of the DC intra prediction mode, the candidate modes comprise:

an intra prediction mode derived by obtaining a first value of adding 61 to a greater mode index among a mode index of the first candidate intra prediction mode and a mode index of the second candidate intra prediction mode and obtaining a second value of applying the 64 modular arithmetic operation to the first value and obtaining a result value of adding 2 to the second value, an intra prediction mode derived by obtaining a third value of subtracting 1 from a greater mode index among a mode index of the first candidate intra prediction mode and a mode index of the second candidate intra prediction mode and obtaining a fourth value of applying the 64 modular arithmetic operation to the third value and obtaining a result value of adding 2 to the fourth value, and an intra prediction mode derived by obtaining a fifth value of adding 60 to a greater mode index among a mode index of the first candidate intra prediction mode and a mode index of the second candidate intra prediction mode and obtaining a sixth value of applying the 64 modular arithmetic operation to the fifth value and obtaining a result value of adding 2 to the sixth value.

\* \* \* \* \*